US005789882A

United States Patent [19]

Ibaraki et al.

[11] Patent Number: 5,789,882
[45] Date of Patent: Aug. 4, 1998

[54] VEHICLE CONTROL APPARATUS ADAPTED TO SELECT ENGINE-OR MOTOR-DRIVE MODE BASED ON PHYSICAL QUANTITY REFLECTING ENERGY CONVERSION EFFICIENCIES IN MOTOR-DRIVE MODE

[75] Inventors: Ryuji Ibaraki, Toyota; Yutaka Taga, Aichi-ken; Hiroshi Hata, Toyota; Atsushi Tabata, Okazaki; Seitoku Kubo, Toyota, all of Japan

[73] Assignee: Toyota Jidosha Kabushiki Kaisha, Toyota, Japan

[21] Appl. No.: 685,102

[22] Filed: Jul. 22, 1996

[30] Foreign Application Priority Data

Jul. 24, 1995 [JP] Japan ................... 7-186852
Dec. 18, 1995 [JP] Japan ................... 7-328444

[51] Int. Cl.$^6$ .................................................. H02P 7/66
[52] U.S. Cl. ............................ 318/148; 318/146; 180/65.3; 180/65.4; 290/40 C; 322/14
[58] Field of Search ................... 180/65.1, 65.2, 180/65.3, 65.4; 290/40 C, 40 R, 40 F, 36 R; 318/140, 141, 143, 146, 148, 151, 802, 799, 806; 322/14, 38, 39

[56] References Cited

U.S. PATENT DOCUMENTS

| | | | |
|---|---|---|---|
| 4,351,405 | 9/1982 | Fields et al. | 180/65.2 |
| 4,407,132 | 10/1983 | Kawakatsu et al. | 180/65.4 |
| 4,951,769 | 8/1990 | Kawamura | 180/65.4 |
| 5,318,142 | 6/1994 | Bates et al. | 180/65.3 |
| 5,343,970 | 9/1994 | Severinsky | 180/65.2 |
| 5,545,928 | 8/1996 | Kotani | 290/40 C |
| 5,566,774 | 10/1996 | Yoshida | 180/65.4 |

FOREIGN PATENT DOCUMENTS

| | | |
|---|---|---|
| 44 30 670 A1 | 3/1995 | Germany. |
| A-63-284031 | 11/1988 | Japan. |
| A-1-153330 | 6/1989 | Japan. |
| A-6-48222 | 2/1994 | Japan. |
| A-6-80048 | 3/1994 | Japan. |
| 6-217413 | 8/1994 | Japan. |
| WO 95/13201 | 5/1995 | WIPO. |

OTHER PUBLICATIONS

I.E.E. Proceedings–D/Control Theory & Applications, vol. 134, No. 6, Nov. 1987.

"Fiat Conceptual Approach to Hybrid Cars Design", International Electric Vehicle Symposium, Anaheim, Dec. 5–7, 1994, pp. 458–469.

*Primary Examiner*—John W. Cabeca
*Attorney, Agent, or Firm*—Oliff & Berridge, PLC

[57] ABSTRACT

A drive control apparatus for an automotive vehicle having an electric motor and an engine operated by combustion of a fuel, the drive control apparatus including a drive source selecting device for selecting an engine drive mode or a motor drive mode on the basis of a first value in the engine drive mode of a physical quantity relating to a condition of the engine and a second value of the same physical quantity reflecting energy conversion efficiencies of the electric motor, an electric generator and an electric energy storage device during an electricity generating mode. The physical quantity is preferably a fuel consumption amount by the engine. The drive control apparatus may also include an engine output determining device that optimizes the efficiency of the system by determining the output of the engine so as to power the vehicle and also provide surplus power to operate the electric generator and charge the electric energy storage device. An enlarging device may also be included to increase the output of the electric motor to prevent excessive charging of the electric energy storage device.

19 Claims, 9 Drawing Sheets

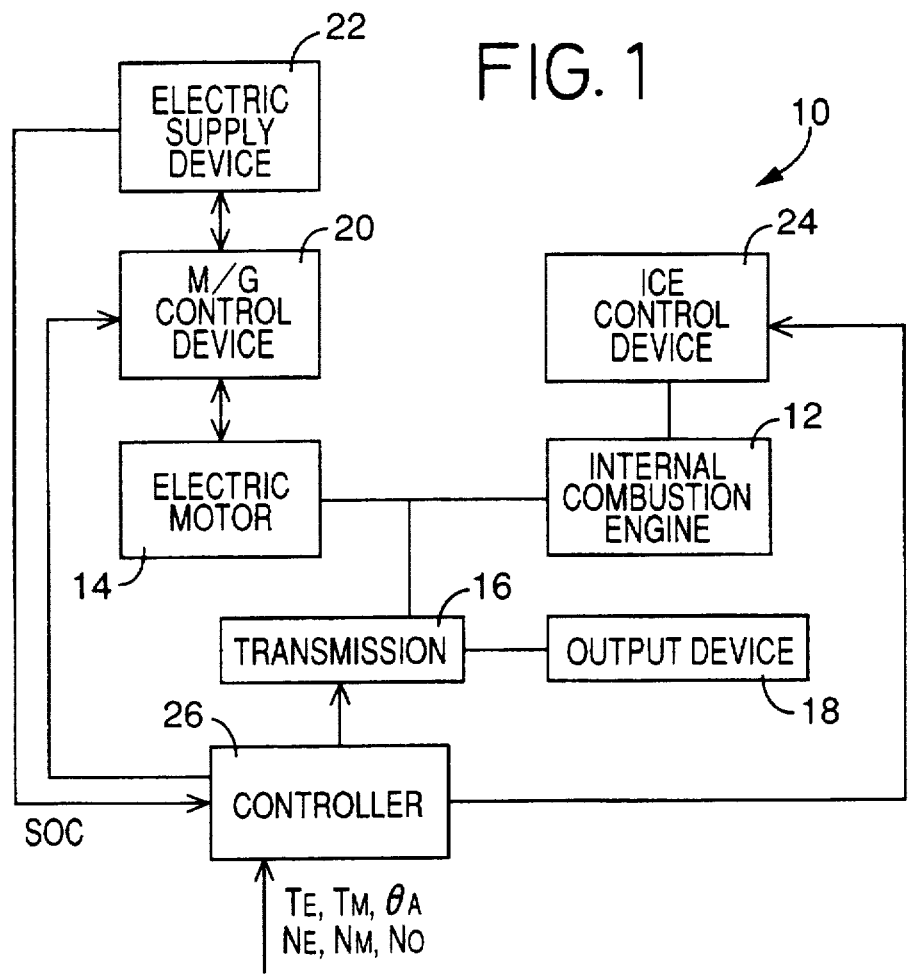
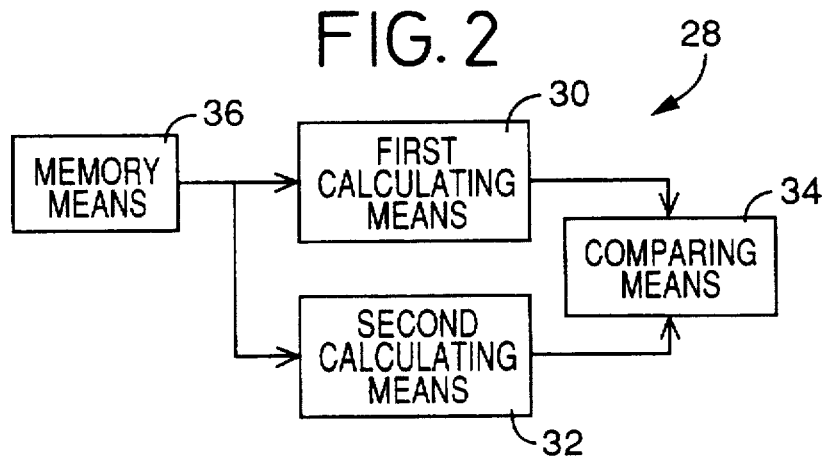

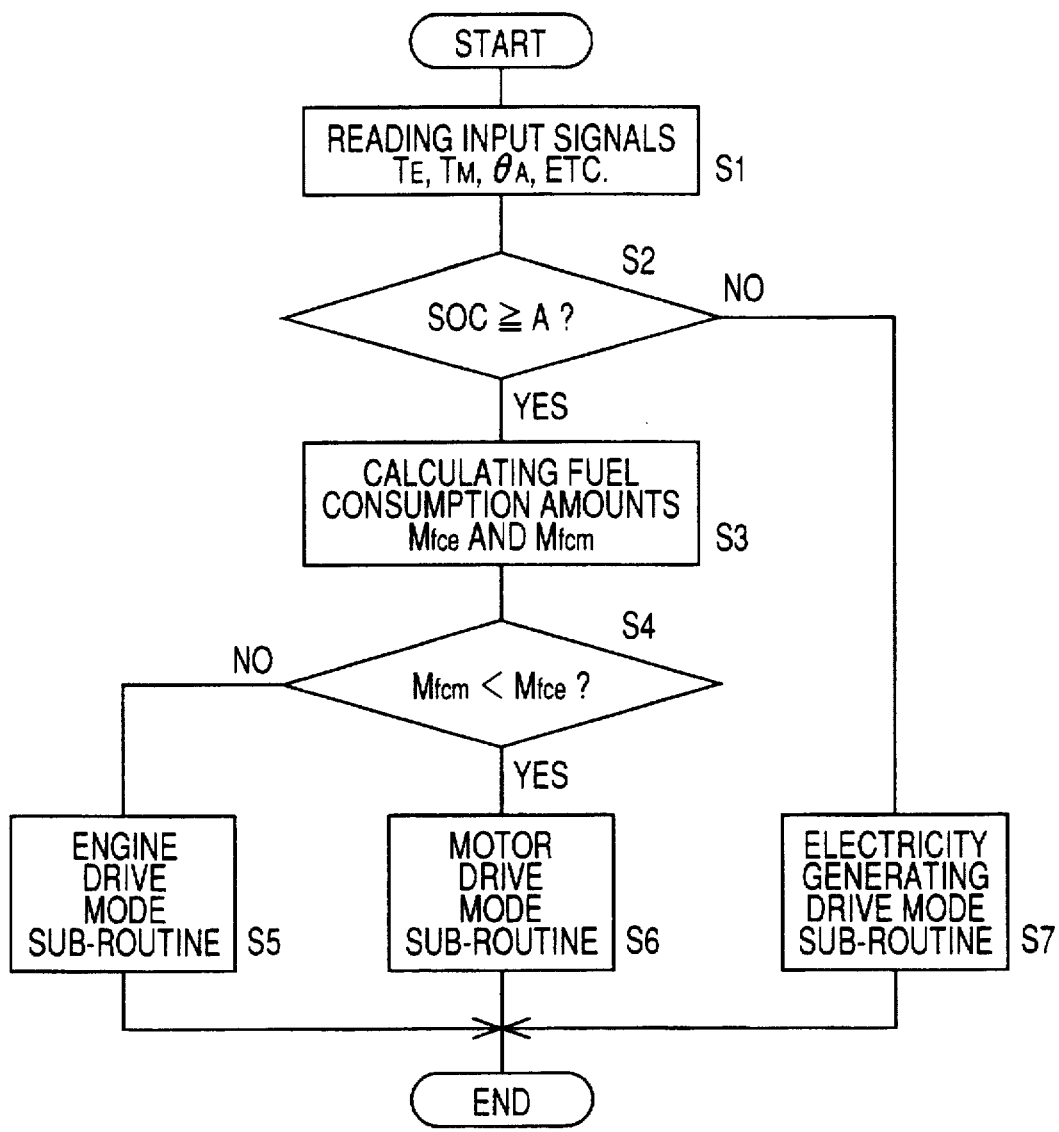

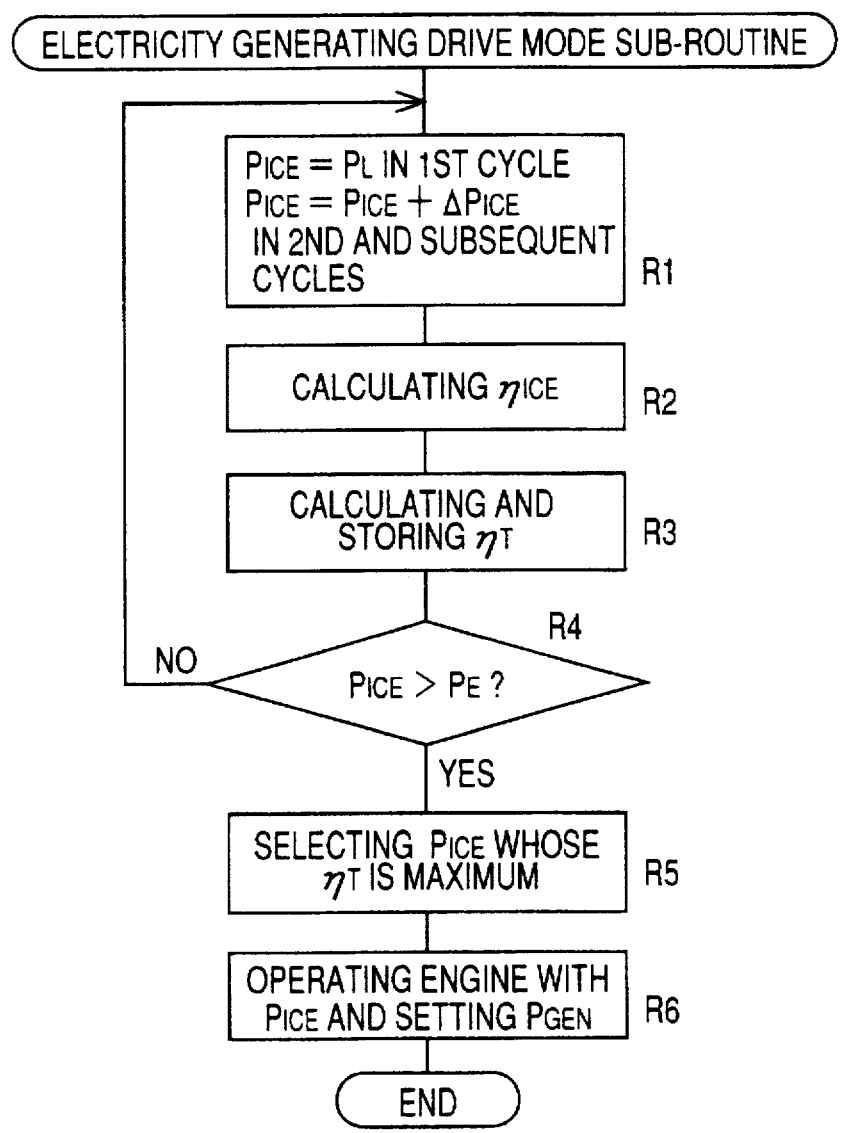

VEHICLE CONTROL APPARATUS ADAPTED TO SELECT ENGINE-OR MOTOR-DRIVE MODE BASED ON PHYSICAL QUANTITY REFLECTING ENERGY CONVERSION EFFICIENCIES IN MOTOR-DRIVE MODE

BACKGROUND OF THE INVENTION

1. Field of the Invention

The present invention relates in general to a drive control apparatus for an automotive vehicle, and more particularly to a drive control apparatus for a so-called "hybrid vehicle" equipped with two drive power sources consisting of an electric motor and an engine such as an internal combustion engine.

2. Discussion of the Related Art

For the purpose of reducing exhaust gas emissions, for example, there has been proposed a so-called "hybrid vehicle" equipped with two drive power sources, which consist of an electric motor operated by an electric energy stored in an electric energy storage device (electric power supply device), and an engine such as an internal combustion engine operated by combustion of a fuel. One type of such hybrid vehicle is adapted to run in an engine drive mode by operation of the engine, or in a motor drive mode by operation of the electric motor, depending upon the running condition of the vehicle. The hybrid vehicle is further adapted to run in an electricity generating drive mode in which the electric motor is operated as an electric generator or dynamo by a surplus torque of the engine during running of the vehicle with the engine selected as the drive power source, so that an electric energy produced by the electric generator (i.e., electric motor) is stored in the electric energy storage device. An example of a drive control apparatus for controlling such a hybrid vehicle is disclosed in JP-A-6-48222 (published in 1994), wherein the engine is controlled so as to have an ideal torque value which is calculated to minimize the amount of consumption of the fuel by the engine or the amount of exhaust gases produced by the engine. During running of the vehicle with the engine, an instantaneous torque value of the engine which is required for running the vehicle under the current running condition of the vehicle is calculated. If the ideal torque value is larger than the required torque value, that is, if the engine has a surplus torque, the vehicle is driven in the electricity generating drive mode, that is, the electric motor is driven by the surplus torque of the engine to charge the electric energy storage device. It will be understood that the electric motor also functions as the electric generator or dynamo.

The vehicle drive control apparatus as described above is further adapted to be placed in a regenerative drive mode wherein the electric generator is driven by a kinetic energy of the running vehicle to generate an electric energy for charging the electric energy storage device as well as to apply a brake to the vehicle. This regenerative drive mode is established when a predetermined regenerative driving condition is satisfied, for example, when the operating amount of the accelerator pedal is zero.

In the known vehicle drive control apparatus described above, the operating condition of the engine is controlled on the basis of only the fuel consumption rate (fuel consumption amount g/kWh per unit power) or the exhaust gas rate (exhaust gas amount per unit power) of the engine. This arrangement does not necessarily assure minimization of the fuel consumption amount or exhaust gas amount for a certain amount of electric energy to be stored in the electric energy storage device. Described more particularly, the efficiency of conversion of the kinetic energy into the electric energy by the electric generator varies with the operating speed and torque of the engine, and the conversion efficiency upon storing the electric energy in the electric energy storage device varies with the electric power (electric energy per unit time). Accordingly, the efficiency in charging the electric energy storage device is not sufficiently high under some operating condition (speed, torque, power, etc.) of the engine. A similar problem is encountered in determining whether the vehicle should be run by the engine in the engine drive motor or by the electric motor in the motor drive mode. To effect this determination in order to minimize the fuel consumption amount or the exhaust gas amount, for example, the fuel consumption amount or the exhaust gas amount when the engine is operated in the electricity generating drive mode while driving the electric motor so as to charge the electric energy storage device is compared with that when the engine is operated in the engine drive motor for the sole purpose of driving the vehicle. The vehicle is run in the motor drive mode if the fuel consumption amount or exhaust gas amount in the electricity generating drive mode is smaller than that in the engine drive mode. The vehicle is run in the engine drive mode if the fuel consumption amount or exhaust gas amount in the engine drive motor is smaller. However, the fuel consumption amount or exhaust gas amount could not be sufficiently reduced if the energy conversion efficiencies of the electric generator and the electric energy storage device would not be taken into account in selecting the engine drive mode or the motor drive mode.

The rule for selecting the engine drive mode or the motor drive mode remains unchanged even where the vehicle runs on a mountain path. During running of the vehicle on a mountain path, the vehicle load is generally high, and the vehicle is more frequently operated in the engine drive mode, whereby the electric energy storage device tends to be excessively charged by the engine through the electric generator while the vehicle is less frequently operated in the motor drive mode. Excessive charging of the electric energy storage device may lead to reduction of the energy conversion efficiency (charging and discharging efficiencies), and may even cause a failure to charge the electric energy storage device. Thus, the known arrangement for selecting the engine or the electric motor as the drive power source does not permit effective utilization of the electric energy, resulting in an increase in the fuel consumption amount or the exhaust gas amount during running of the vehicle on a mountain path.

SUMMARY OF THE INVENTION

It is therefore an object of this invention to provide a drive control apparatus for a hybrid vehicle equipped with an electric motor and an engine as drive sources, which apparatus permits effective reduction in the fuel consumption amount or exhaust gas amount of the engine.

According to a first aspect of the present invention, there is provided a drive control apparatus for an automotive vehicle having an electric generator for generating an electric energy, an electric energy storage device for storing the electric energy generated by the electric generator, an electric motor operated as a first drive power source by the electric energy, and an engine operated as a second drive power source by combustion of a fuel, the apparatus having an engine drive mode in which the vehicle is driven by the engine, a motor drive mode in which the vehicle is driven by the electric motor, and an electricity generating mode in which the electric generator is operated by the engine to charge the electric energy storage device, the apparatus selecting one of the engine drive mode, the motor drive mode and the electricity generating mode, depending upon a running condition of the vehicle, the apparatus being characterised by drive source selecting means for selecting one of the engine drive mode and the motor drive mode, on the basis of a first value in the engine drive mode of a physical quantity relating to a condition of the engine and a second value of the physical quantity reflecting energy conversion efficiencies of the electric generator, the electric motor and the electric energy storage device in the electricity generating mode, and according to a predetermined rule associated with the first and second values.

In the vehicle drive control apparatus constructed according to the first aspect of this invention, the drive source selecting means selects the engine drive mode for running the vehicle with the engine or the motor drive mode for running the vehicle with the electric motor, according to the predetermined rule associated with the first and second values of a selected physical quantity relating to a condition of the engine, such as an amount of consumption of the fuel by the engine or an amount of exhaust gases produced by the engine. The first value is the physical quantity value in the engine drive mode, while the second value is the physical quantity value in the electricity generating mode in which the electric generator is operated by the engine to generate the electric energy which is stored in the electric energy storage device and which is used by the electric motor in the motor drive mode. The drive source selecting means obtains the second value while taking into account of the energy conversion efficiency values of the electric motor, electric generator and electric energy storage device in the electricity generating mode. The use of this second value which reflects the energy conversion efficiency values in the electricity generating mode permits adequate selection of the engine drive mode or the motor drive mode so as to effectively increase or decrease the physical quantity of the engine, for example, minimize the fuel consumption amount or exhaust gas emission amount of the engine. Where the fuel consumption amount is used as the physical quantity, for instance, the engine drive mode is selected if the first value of the fuel consumption amount in the engine drive mode is smaller than the second value in the electricity generating mode, while the motor drive mode is selected if the second value is smaller than the first value. This arrangement is effective to minimize the fuel consumption amount of the engine. Where the exhaust gas emission amount is used as the physical quantity, the engine drive mode and the motor drive modes are selected on the basis of the first and second values as compared with each other in the same manner as described above, so as to minimize the exhaust gas emission amount.

In one preferred form of the present drive control apparatus, the drive source selecting means comprises: (a) first calculating means for obtaining the first value of the physical quantity in the engine drive mode; (b) second calculating means for obtaining the second value of the physical quantity which second value reflects the energy conversion efficiencies in the electricity generating mode in which the electric generator is operated by the engine to generate the electric energy to be stored in the electric energy storage device and used by the electric motor in the motor drive mode; and (c) comparing means for comparing the first and second values of the physical quantity obtained by the first and second calculating means, and selecting one of the engine drive mode and the motor drive mode depending upon whether one of the first and second values is smaller than the other.

Where the physical quantity is an amount of consumption of the fuel by the engine or an amount of exhaust gas emission from the engine, the first and second calculating means obtain a first value and a second value of the amount of consumption of the fuel or the amount of exhaust gas emission in the engine drive mode and the electricity generating mode, respectively. In this case, the comparing means may be adapted to select the engine drive mode if the first value obtained by the first calculating means is smaller than the second value obtained by the second calculating means, and select the motor drive mode if the first value is not smaller than the second value.

In the above case, the first calculating means may be adapted to calculate the first value of the amount of consumption of the fuel in the engine drive mode, by using a speed and a torque of the engine, and the second calculating means may be adapted to calculate the second value of the amount of consumption of the fuel by the engine in the electricity generating mode, by using a speed and a torque of the electric motor.

The fuel consumption amount or exhaust gas emission amount of the engine may be substantially represented by the speed and torque of the engine. Therefore, the fuel consumption amount or exhaust gas emission amount during running of the vehicle in the engine drive motor may be obtained on the basis of the engine speed and torque which vary with the specific running condition of the vehicle. On the other hand, the energy conversion efficiency during running of the vehicle in the motor drive mode may be substantially represented or determined by the speed and torque of the electric motor which vary with the specific running condition of the vehicle. The discharging efficiency of the electric energy storage device during use of the electric energy stored in this storage device in the motor drive mode may be substantially determined by electric power of the electric motor or engine, namely, an amount of electric energy per unit time. The charging efficiency of the electric energy storage device in the electricity generating mode in which the electric energy generated by the electric generator by operation of the engine is stored in the storage device is substantially constant where the charging is effected in the electricity charging mode under a predetermined constant condition, for example, when the vehicle is in a stop with the engine kept operating. In the light of these facts, the amount of fuel consumption required for charging the electric energy storage device in the electricity generating mode and running the vehicle in the motor drive mode may be represented by the speed and torque of the electric motor which vary with the specific vehicle running condition, like the engine speed and torque. For the same reason, the amount of the exhaust gases emitted from the engine may be represented by the motor speed and torque. Therefore, the selection of the engine drive mode or the motor drive mode may be effected on the basis of the engine speed and torque (motor speed and torque) and according to a stored data map which is formulated to select one of the engine drive mode and the motor drive mode which requires a smaller amount of consumption of the fuel by the engine or which results in a smaller amount of exhaust gas emission from the engine. This arrangement using the data map does not require data processing operations to calculate the first and second values of the fuel consumption amount or exhaust gas emission amount, and does not require calculating means as described above. The drive source selecting means may use a parameter or parameters other than the speed and torque of the engine or motor, which reflect the energy conversion efficiency of the electric energy storage device, for example. It is also noted that the rate of change of the energy conversion efficiency values of the electric system associated with the electric generator and motor and the electric energy storage device is generally lower than the rate of change of the fuel consumption rate or exhaust gas emission rate of the engine. In this respect, the selection of the engine drive mode and the motor drive mode may be advantageously effected according to a data map associated with the fuel consumption rate or exhaust gas emission rate of the engine.

In another preferred form of the vehicle drive control apparatus of this first aspect of the invention, the energy conversion efficiencies which are reflected by the second value of the selected physical quantity comprise at least one of: efficiency of conversion of a kinetic energy into the electric energy by the electric generator in the electricity generating mode; efficiency of charging of the electric energy storage device with the electric energy generated by the electric generator in the electricity generating mode; efficiency of discharging of the electric energy storage device in the motor drive mode; and efficiency of conversion of the electric energy stored in the electric energy storage device into a kinetic energy by the electric motor in the motor drive mode.

The electric generator and the electric motor may be provided as separate elements. Alternatively, the electric motor may function as the electric generator.

According to a second aspect of the present invention, there is provided a drive control apparatus for an automotive vehicle having an electric generator for generating an electric energy, an electric energy storage device for storing the electric energy generated by the electric generator, an electric motor operated as a first drive power source by the electric energy, and an engine operated as a second drive power source by combustion of a fuel, the apparatus having an engine drive mode in which the vehicle is driven by the engine, a motor drive mode in which the vehicle is driven by the electric motor, and an electricity generating mode in which the electric generator is operated by the engine to charge the electric energy storage device, the apparatus being characterised by engine output determining means for determining a desired output of the engine in the electricity generating mode, on the basis of an overall efficiency of a system assigned to charge the electric energy storage device in the electricity generating mode, the overall efficiency being associated with a physical quantity relating to a condition of the engine, and said overall efficiency reflecting energy conversion efficiencies of the electric energy storage device and the electric generator in the electricity generating mode.

In the vehicle drive control apparatus constructed according to the second aspect of this invention, the engine output determining means is adapted to determine the desired engine output for operating the electric generator to charge the electric energy storage device in the electricity generating mode, on the basis of the overall efficiency of a selected physical quantity of the engine such as the fuel consumption amount or exhaust gas emission amount of the engine, which overall efficiency reflects the energy conversion efficiencies of the electric energy storage device and the electric generator in the electricity generating mode. This arrangement is effective to maximize or minimize the selected physical quantity of the engine such as the fuel consumption amount or exhaust gas emission amount per unit amount of electric energy to be stored in the electric energy storage device in the electricity generating mode. Where the fuel consumption amount of the engine is used as the physical quantity, the desired output of the engine is determined so as to maximize the overall efficiency relating to the fuel consumption of the engine. In this case, the ratio of the fuel consumption amount of the engine to the electric energy to be stored in the electric energy storage device is minimized. Where the exhaust gas emission amount of the engine is used as the physical quantity, the desired output of the engine is determined so as to maximize the overall efficiency relating to the exhaust gas emission of the engine. In this case, the ratio of the exhaust gas emission amount to the electric energy to be stored in the electric energy storage device is minimized.

In one preferred form of the vehicle drive control apparatus according to the second aspect of the invention, the engine output determining means determines the desired output of the engine such that the desired output is larger than a value of drive power required for the engine to drive the vehicle in the engine drive mode, by a predetermined amount which provides surplus power by which the electric generator is operated to charge the electric energy storage device.

In one advantageous arrangement of the above preferred form of the apparatus, the engine output determining means comprises: calculating means for calculating values of the overall efficiency which correspond to different candidate values of the desired output of the engine, respectively, the values of the overall efficiency reflecting the energy conversion efficiencies of the electric energy storage device and the electric generator during operation of the electric generator by the surplus power in the electricity generating mode; and determining means for selecting one of the different candidate values of the desired output of the engine which corresponds to one of the values of the overall efficiency which satisfies a predetermined condition, and determining the selected candidate value as the desired output of the engine. The different candidate values of the desired output of the engine correspond to different values of the surplus power by which the electric generator is operated to charge the electric energy storage device. The determining means indicated above may be adapted to determine, as the desired output of the engine, one of the candidate values which corresponds to a highest one of the values of the overall efficiency.

The output of the engine may be represented by the torque and speed of the engine. Similarly, the energy conversion efficiencies of the electric generator and the electric energy storage device may be represented by the torque and speed or electric power (drive power) of the engine. In view of these facts, the desired output of the engine in the electricity generating mode may be determined on the basis of the engine torque and speed and according to a predetermined relationship between the desired engine output and the engine torque and speed, which relationship is represented by a stored data map. The engine torque and speed represent the current running condition of the vehicle, namely, the drive power currently required by the engine to operate the electric motor to charge the electric energy storage device. The relationship is formulated to determine the desired output of the engine so as to maximize the overall efficiency of the selected physical quantity such as the fuel consumption amount of the engine. This arrangement using the data map does not require operations to calculate the overall efficiency values corresponding to different candidate values of the engine output, and does not require the calculating means as described above. The desired engine output in the electricity generating mode may be determined using a parameter or parameters other than the engine torque and speed, which parameters reflect a condition of charging of the electric energy storage device in the electricity generating mode. Where the electric energy storage device is charged under a substantially constant condition, for example, when the vehicle is in a stop with the engine kept operating, the engine output determining means may be adapted to set the desired engine output at a constant value, which is determined depending upon the energy conversion efficiencies of the electric generator and the electric energy storage device.

According to a third aspect of this invention, there is provided a drive control device for an automotive vehicle having an electric generator for generating an electric energy, an electric energy storage device for storing the electric energy generated by the electric generator, an electric motor operated as a first drive power source by the electric energy, and an engine operated as a second drive power source by combustion of a fuel, the apparatus comprising: (a) engine driving means for running the vehicle by operation of the engine in an engine drive mode while a running condition of the vehicle is held within a engine driving range; (b) motor driving means for running the vehicle by operation of the electric motor in a motor drive mode while the running condition is held within a motor driving range; (c) regenerative driving means for running the vehicle in a regenerative drive mode in which the electric generator is driven by a kinetic energy of the running vehicle so as to store an electric energy in the electric energy storage device as well as to apply a brake to the vehicle, the regenerative drive mode is selected when the running condition of the vehicle satisfies a predetermined requirement; and (d) enlarging means for enlarging the motor driving range when an amount of the electric energy stored in the electric energy storage device by operation of the electric generator in the regenerative drive mode is larger than a predetermined threshold.

In the vehicle drive control apparatus constructed according to the third aspect of the present invention, the enlarging means is adapted to enlarge the motor driving range when the amount of the electric energy stored in the electric energy storage device in the regenerative drive mode is larger than the predetermined threshold. As a result, the amount of the electric energy consumed by the electric motor in the motor drive mode tends to be increased, and the electric energy stored in the electric energy storage device tends to be accordingly reduced. Thus, this arrangement is effective to prevent an excessively charged state of the electric energy storage device which would occur during running of the vehicle on a mountain path and which would cause reduction in the energy conversion efficiency or a failure to charge the energy storage device. Since the amount of consumption of the fuel by the engine is reduced by enlargement of the motor driving range, the amount of exhaust gas emission from the engine is accordingly reduced.

In one preferred form of the present apparatus, the engine driving range and the motor driving range are determined on the basis of a physical quantity relating to a condition of the engine in the engine drive mode and in an electricity generating mode in which the electric generator is driven by the engine to generate the electric energy which is stored in the electric energy storage device and which is used by the electric motor in the motor drive mode. In this case, the enlarging means may be adapted to enlarge the motor driving range such that a portion of the engine driving range in which the operation of the engine is less desirable in terms of the physical quantity than in the other portion of the engine driving range is replaced by a portion of the enlarged motor driving range.

In the above form of the apparatus, the motor driving range is enlarged such that the enlarged motor driving range includes a portion of the engine driving range in which the operation of the engine is less desirable in terms of the physical quantity of the engine such as the fuel consumption amount or the exhaust gas emission amount than in the other portion of the engine driving range. For instance, a portion of the engine driving range in which the fuel consumption amount or exhaust gas emission amount is relatively large is replaced by the enlarged motor driving range. Usually, such portion of the engine driving range is adjacent to the original motor driving range. This arrangement is effective to reduce the fuel consumption amount or exhaust gas emission amount.

In one advantageous arrangement of the above preferred form of the apparatus, the engine driving range and the motor driving range may be determined on the basis of a first value of the physical quantity in the engine drive mode and a second value of the physical quantity which reflects energy conversion efficiencies of the electric generator, the electric motor and the electric energy storage device in the electricity generating mode. This arrangement is effective to further reduce the fuel consumption amount and the exhaust gas emission amount, since the motor driving range and the engine driving range are determined depending upon the second value of the physical quantity of the engine which reflects the energy conversion efficiencies of the electric motor, electric generator and electric energy storage device, as in the apparatus according to the first aspect of this invention in which the drive source selecting means selects the engine drive mode or the motor drive mode on the basis of the first and second values of the physical quantity of the engine as described above.

In another preferred form of the third aspect of this invention, the apparatus further comprises memory means for storing a data map representative of boundary lines which define the engine driving range and motor driving range in relation to the running condition of the vehicle, for example, in relation to a drive torque and a running speed of the vehicle. In this case, the enlarging means comprises shifting means for shifting one of the boundary lines to enlarge the motor driving range. In this case, too, it is desirable that the engine driving range and the motor driving range be determined or defined on the basis of the first and second values of the physical quantity of the engine as described above with respect to the first aspect of the invention and the advantageous arrangement of the third aspect of the invention. However, the use of the second value reflecting the energy conversion efficiencies of the electric motor and generator and the electric energy storage device is not essential, and the engine and motor driving ranges may be determined using other parameters. The engine driving range and the motor driving range need not be completely separate from each other, but may partially overlap each other.

The motor driving range may be enlarged such that the enlarged motor driving range includes a portion of the original engine driving range which is either adjacent to the original motor driving range or separate from the original motor driving range.

The enlarging means may be adapted to enlarge the motor driving range such that the amount of enlargement of the motor driving range is constant or variable. In the latter case, the amount of enlargement may vary with the amount of the electric energy stored in the electric energy storage device. In the enlarged motor driving range, only the electric motor or both of the electric motor and the engine may be operated to drive the vehicle. Where only the electric motor is operated to drive the vehicle in the enlarged motor driving range, the original motor driving range is enlarged so as include a portion that causes an operation of the electric motor under a relatively high load. In this case, the boundary of the enlarged motor driving range on the side of the high-load operation of the electric motor should be determined so as to satisfy a predetermined running condition of the vehicle, for example, so that the running velocity V (km/h) of the vehicle driven by only the electric motor is higher than a predetermined lower limit during running of the vehicle under a given running condition, for instance, during running on a road surface having a given gradient (X°). The capacity of the electric motor is generally determined depending upon the ability of the electric generator to charge the electric energy storage device in the regenerative drive mode. Accordingly, the higher-load side boundary of the original motor driving range is usually sufficiently offset from the upper limit corresponding to the maximum output of the electric motor, so that the higher-load side boundary of the original motor driving range can be shifted toward the upper limit corresponding to the maximum output. Therefore, the original motor driving range can be enlarged in the direction toward the maximum output limit of the electric motor. Where the vehicle is equipped with a transmission, it is desirable that the shift pattern or rule for shifting the transmission be changed when the motor driving range is enlarged.

The enlarging means may use a first data map which define the original engine driving range and the original motor driving range, and a second data map which define the enlarged motor driving range and which is used when the amount of the electric energy stored in the electric energy storage device in the regenerative drive mode is larger than the predetermined threshold. Where the vehicle is equipped with a transmission, it is possible to change the speed ratio or shift pattern of the transmission to thereby substantially enlarge the motor driving range, without changing a boundary as defined by a data map which define the original motor driving range.

In another preferred form of the apparatus of the third aspect of this invention, the enlarging means comprises: detecting means for detecting the amount of the electric energy stored in the electric energy storage device in the regenerative drive mode; determining means for determining whether the amount of the electric energy detected by the detecting means is larger than the predetermined threshold; and means for enlarging the motor driving range if the determining means determines that the amount of the electric energy detected by the detecting means is larger than the predetermined threshold. The amount of the electric energy stored in the electric energy storage device in the regenerative drive mode is desirably detected for a predetermined time duration or during running of the vehicle by a predetermined distance, so that the thus detected amount is compared with the predetermined threshold.

While the determination as to whether the amount of the electric energy stored in the regenerative amount can be made by comparing the actually detected amount of the electric energy with the threshold, the determination is possible by determining whether the time duration of the vehicle running in the regenerative drive mode within a predetermined time of the vehicle running exceeds a predetermined threshold, or by determining whether the running distance of the vehicle in the regenerative drive mode per predetermined overall running distance of the vehicle exceeds a predetermined threshold. However, the amount of the electric energy stored in the regenerative mode per unit running time or distance of the vehicle in the regenerative drive mode varies with the running condition of the vehicle such as the vehicle running speed. In this respect, the actually detected amount of the electric energy stored in the regenerative drive mode is desirably compared with the threshold.

In the motor driving range, the electric motor may be operated solely by the electric energy which has been stored in the electric energy storage device, or both the electric energy which has been stored in the electric energy storage device and the electric energy which is currently generated by the electric generator by operation of the engine. In the latter case, the engine is operated together with the electric motor, for the sole purpose of driving the electric generator to generate the electric energy which is additionally used by the electric motor in the motor drive mode. Two or more electric motors may be provided for the respective drive wheels of the vehicle, or a single electric motor may be provided for all of the drive wheels. Where the vehicle is equipped with a transmission, however, the drive wheels are desirably driven by a single electric motor in the motor drive mode.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 1 is a block diagram illustrating an arrangement of a vehicle drive control apparatus constructed according to one embodiment of the present invention;

FIG. 2 is a block diagram illustrating the functions achieved by a portion of a controller in the vehicle drive control apparatus of FIG. 1;

FIG. 3 is a flow chart illustrating a routine executed by the drive control apparatus of FIG. 1 for running the vehicle in a selected one of three modes;

FIG. 4 is a flow chart for explaining an ELECTRICITY GENERATING DRIVE mode sub-routine in step S7 of the routine of FIG. 3.

DETAILED DESCRIPTION OF THE PREFERRED EMBODIMENTS

Figure 5:
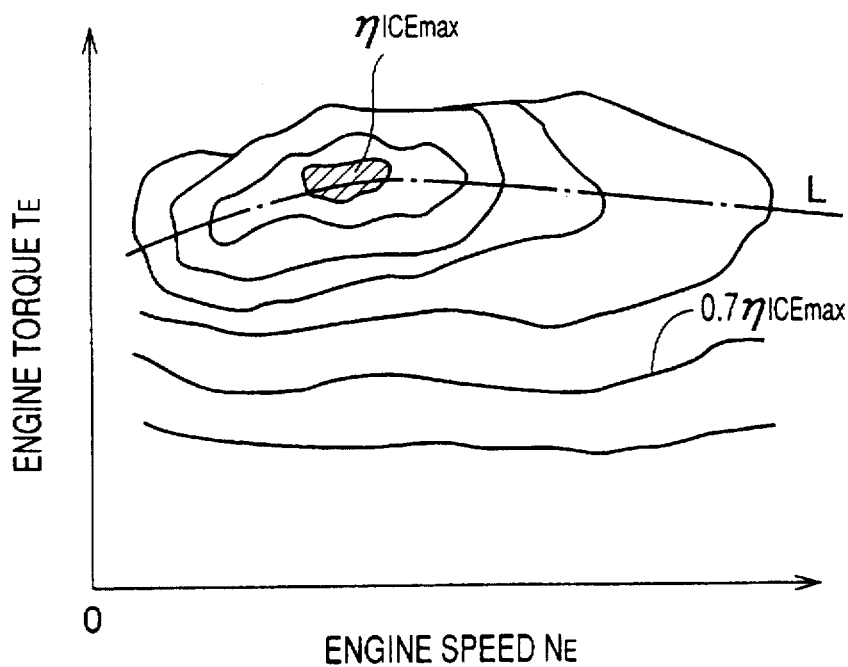
FIG. 5 is graph showing an example of data map indicating the fuel consumption efficiency of an internal combustion engine, which data map is used by the vehicle drive control apparatus of FIG. 1.

Referring first to FIG. 1, one embodiment of a vehicle drive control apparatus 10 of the present invention will be described. The apparatus 10 is adapted to control a so-called "hybrid vehicle" which is equipped with two drive sources, one of which is an internal combustion engine 12 such as a gasoline engine operated by combustion of a fuel, and the other of which is a dynamo-electric motor 14 functioning as an electric motor and an electric generator (dynamo). Power of the internal combustion engine 12 and power of the motor 14 are simultaneously or selectively transferred to a transmission 16, and to right and left drive wheels via an output device 18. The transmission 16 may include a speed changing mechanism and a forward/reverse switching mechanism. The speed changing mechanism may be adapted to change the speed ratio either in steps or continuously, or may have a predetermined speed ratio. The forward/reverse switching mechanism has a forward drive position for forward running of the vehicle and a reverse drive position for backward running of the vehicle. The motor 14 may be operated in a reverse direction to run the vehicle backward. Appropriate clutch or clutches may be disposed between the engine 12 and the motor 14, and/or between these drive source or sources 12, 14 and the transmission 16, so that the drive sources 12, 14 and transmission 16 are disconnected from each other as needed.

The motor 14 is connected to an electric energy storage device (electric power supply device) 22 in the form of a battery, for example, through a motor/generator control device (hereinafter abbreviated as "M/G control device) 20 so that the motor 14 is selectively placed in a DRIVE state, a CHARGING state, and a NON-LOAD state. In the DRIVE state, the motor 14 is driven by an electric energy supplied from the electric energy storage device 22. In the CHARGING state, the motor 14 functions as an electric generator or dynamo, with regenerative braking (braking torque electrically generated by the motor 14 itself), for storing an electric energy in the electric energy storage device 22. In the NON-LOAD state, the output shaft of the motor 14 is permitted to rotate freely. The engine 12 is controlled by an internal combustion engine control device (hereinafter abbreviated as "ICE control device") 24, which includes an actuator for controlling the amount of a fuel injected into the engine 12, an actuator for controlling a throttle valve of the engine 12, an actuator for controlling the ignition timing of the engine 12, and an actuator for controlling suction and exhaust valves of the engine 12. The M/G control device 20 and the ICE control device 24 are controlled by a controller 26.

The controller 26 includes a microcomputer incorporating a central processing unit (CPU), a random-access memory (RAM), and a read-only memory (ROM). The CPU operates according to control programs stored in the ROM while utilizing a temporary data storage function of the RAM. The controller 26 is selectively placed in one of an ENGINE DRIVE mode, a MOTOR DRIVE mode and an ELECTRICITY GENERATING DRIVE mode. In the ENGINE DRIVE mode, the vehicle is driven by the internal combustion engine 12. In the MOTOR DRIVE mode, the vehicle is driven by the electric motor 14. In the ELECTRICITY GENERATING DRIVE mode, the vehicle is driven by the engine 12 while the motor 14 is driven by the engine 12 so as to charge the electric energy storage device 22. The controller 26 is supplied with input signals from various detecting devices. These input signals include signals indicative of a torque $T_E$ of the engine 12, a torque $T_M$ of the motor 14, an operating amount $\theta_A$ of an accelerator pedal, a speed $N_E$ of the engine 12, a speed $N_M$ of the motor 14, an output speed $N_O$ of the transmission 16, and a charging amount SOC of the electric energy storage device 22.

The controller 26 includes drive source selecting means 28 illustrated in the block diagram of FIG. 2. The drive source selecting means 28 selectively establishes the ENGINE DRIVE mode or the MOTOR DRIVE mode. The drive source selecting means 28 includes first calculating means 30 for calculating a fuel consumption amount $M_{fce}$ of the engine 12 in the ENGINE DRIVE mode in which the engine 12 is selected as the drive power source for running the vehicle. This fuel consumption amount $M_{fce}$ is calculated according to the following equation (1):

$$M_{fce} = FCe \times P_L \tag{1}$$

The drive source selecting means 28 also includes second calculating means 32 for calculating a fuel consumption amount $M_{fcm}$ of the engine 12 in the ELECTRICITY GENERATING DRIVE mode in which the motor 14 is driven by the engine 12 for charging the electric energy storage device 22 with an electric energy necessary to run the vehicle in the MOTOR DRIVE mode (with the motor 14 selected as the drive power source). The calculation of the fuel consumption amount $M_{fcm}$ is calculated according to the following equation (2):

$$M_{fcm} = FCm \times P_L / (\eta_{GEN} \times \eta_{BIN} \times \eta_{BOUT} \times \eta_{MOT}) \tag{2}$$

The drive source selecting means 28 further includes comparing means for comparing the calculated fuel consumption amounts $M_{fce}$ and $M_{fcm}$, for selecting the ENGINE DRIVE mode or the MOTOR DRIVE mode. It will be understood that the drive source selecting means 28 is adapted to select the ENGINE DRIVE mode or MOTOR DRIVE mode depending upon values of a physical quantity in the form of the fuel consumption amount $M_{fc}$ of the engine 12, according to a predetermined rule, more specifically, on the basis of the physical quantity values in the form of the fuel consumption amounts $M_{fcm}$ and $M_{fce}$ as compared with each other, such that the MOTOR DRIVE mode is selected when the fuel consumption amount $M_{fcm}$ is smaller than the fuel consumption amount $M_{fce}$ while the ENGINE DRIVE mode is selected when the fuel consumption amount $M_{fcm}$ is not smaller than the fuel consumption amount $M_{fce}$.

$P_L$ in the above equations (1) and (2) represents instantaneous drive power required for running the vehicle, which power includes components for overcoming an air resistance of the vehicle and a rolling resistance of the tire of each vehicle wheel. The required drive power $P_L$ may be determined on the basis of the engine speed $N_E$ and torque $T_E$ (or the motor speed $N_M$ and torque $T_M$) and the amount or rate of change of the accelerator pedal operating amount $\theta_A$, and according to a predetermined relationship between the required drive power $P_L$ and these parameters. This relationship is represented by a data map stored in memory means 36 also included in the drive source selecting means 28, as indicated in FIG. 2. Other data necessary to calculate the required drive power $P_L$ are also stored in the memory means 36.

FCe represents a fuel consumption rate (g/kWh) of the internal combustion engine 12 when the required drive power $P_L$ is provided by the engine 12. This fuel consumption efficiency FCe may be determined on the basis of the engine torque $T_E$ and speed $N_E$, and according to a predetermined relationship between the efficiency FCe and these parameters, which relationship is represented by a data map also stored in the memory means 36. The graph of FIG. 5 shows an iso-fuel consumption rate of the engine 12. In the graph, a hatched area indicates the lowest value of the fuel consumption rate FCe at which the power per unit fuel amount is the highest. The fuel consumption rate FCe increases from the hatched area in the outward direction away from the hatched area. Since the required instantaneous drive power $P_L$ is represented by the engine speed $N_E$ and torque $T_E$, the fuel consumption rate FCe may be obtained from the data map of FIG. 5, depending upon the required drive power $P_L$. Data necessary to calculate the fuel consumption rate FCe are also stored in the memory means 36.

$\eta_{ICEmax}$ in FIG. 5 represents a maximum value of the fuel consumption efficiency $\eta_{ICE}$ (reciprocal of the fuel consumption rate FCe). The fuel consumption efficiency $\eta_{ICE}$ decreases from the hatched area in the outward direction away from the hatched area. The fuel consumption efficiency $\eta_{ICE}$ may be set with the maximum value $\eta_{ICEmax}$ being "1".

FCm in the above equation (2) represents the fuel consumption rate of the engine 12 when the motor 14 is driven by the engine 12 in the ELECTRICITY GENERATING DRIVE mode to charge the electric energy storage device 22, while $\eta_{GEN}$, $\eta_{BIN}$, $\eta_{BOUT}$ and $\eta_{MOT}$ represent the following:

$\eta_{GEN}$: electricity generating efficiency, i.e., efficiency of conversion from kinetic energy into electric energy by the motor 14 (functioning as the electric generator)

$\eta_{BIN}$: charging efficiency, i.e., energy conversion efficiency upon charging of the electric energy storage device 22

$\eta_{BOUT}$: discharging efficiency, i.e., energy conversion upon consumption of the electric energy stored in the electric energy storage device 22

$\eta_{MOT}$: motor driving efficiency, i.e., efficiency of conversion from electric energy into kinetic energy by the motor 14

Figure 6:
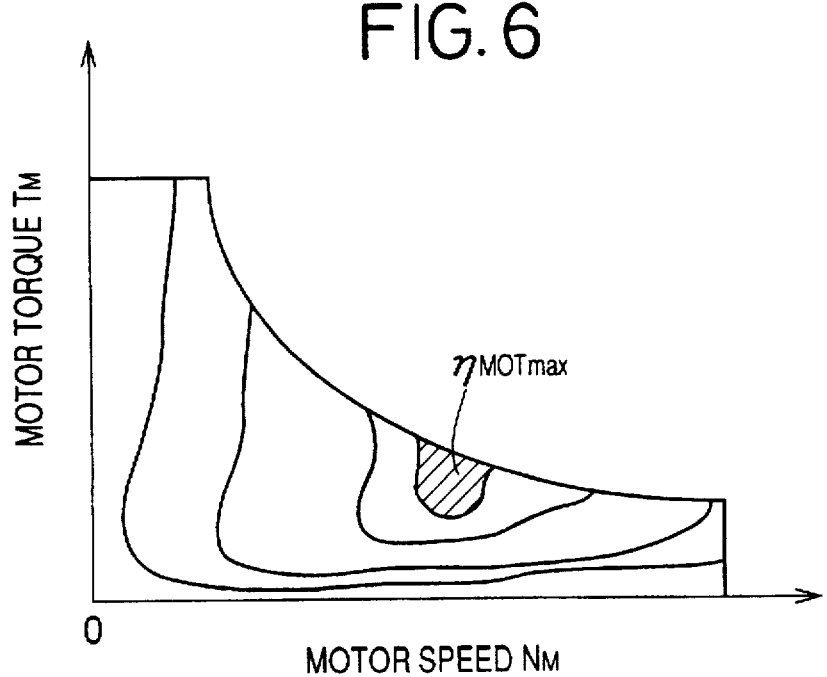
FIG. 6 is a graph showing an example of data map indicating the energy conversion efficiency of an electric motor, which data map is used by the vehicle drive control apparatus of FIG. 1.

The motor driving efficiency $\eta$MOTmay be represented by the motor torque $T_M$ and speed $N_M$, and may be obtained depending upon the operating condition of the motor 14, namely, depending upon the required drive power $P_L$. The graph of FIG. 6 shows an iso-motor driving efficiency. In the graph, a hatched area in the graph indicates the highest value $\eta_{MOTmax}$ of the motor driving efficiency $\eta_{MOT}$ at which the power per unit electric energy is the highest. The motor driving efficiency $\eta_{MOT}$ decreases from the hatched area in the outward direction away from the hatched area. Since the required drive power $P_L$ is represented by the motor speed $N_M$ and torque $T_M$, the motor driving efficiency $\eta_{MOT}$ may be obtained from the data map of FIG. 6, depending upon the required drive power $P_L$. The discharging efficiency $\eta_{BOUT}$ may be represented by the charging amount SOC of the electric energy storage device 22 and the amount of electric energy to be supplied from the device 22 per unit time (electric power). The signal indicative of the charging amount SOC is received from the device 22, and the amount of electric energy to be supplied per unit time corresponds to the required drive power $P_L$. Therefore, the discharging efficiency $\eta_{BOUT}$ may be obtained on the basis of the charging amount SOC and the required drive power $P_L$ and according to a predetermined relationship between the efficiency $\eta_{BOUT}$ and these values SOC, $P_L$. This relationship is represented by a data map stored in the memory means 36. Other data (such as equations) necessary to calculate the motor driving efficiency $\eta_{MOT}$ and the discharging efficiency $\eta_{BOUT}$ are also stored in the memory means 36.

On the other hand, the fuel consumption rate FCm, electricity generating efficiency $\eta_{GEN}$ and charging efficiency $\eta_{BIN}$ are estimated in the ELECTRICITY GENERATING DRIVE mode in which the motor 14 is driven by the engine 12 to charge the electric energy storage device 22. The thus estimated values FCe, $\eta_{GEN}$ and $\eta_{BIN}$ are independent or irrespective of the current running condition of the vehicle. The ELECTRICITY GENERATING DRIVE mode is selected when the charging amount SOC of the electric energy storage device 22 is smaller than a predetermined threshold value "A", as described below by reference to the flow chart of FIG. 4. To calculate the fuel consumption amount $M_{fcm}$ in step S4 of the routine of FIG. 4, average values (e.g., moving averages) of FCm, $\eta_{GEN}$, $\eta_{BIN}$ in previous vehicle runs in the ELECTRICITY GENERATING DRIVE mode, or values of FCm, $\eta_{GEN}$, $\eta_{BIN}$ in the last vehicle run in the ELECTRICITY GENERATING DRIVE mode are stored in the memory means 36. The fuel consumption amount $M_{fcm}$ is calculated on the basis of those values of FCm, $\eta_{GEN}$, $\eta_{BIN}$ stored in the memory means 36 as well as the currently obtained $\eta_{BOUT}$ and $\eta_{MOT}$. In the ELECTRICITY GENERATING DRIVE mode, the values FCm, $\eta_{GEN}$ and $\eta_{BIN}$ are obtained as described below.

Like the fuel consumption rate FCe, the fuel consumption rate FCm may be obtained on the basis of the engine torque $T_E$ and speed $N_E$ and according to a predetermined relationship between the rate FCm and these values $T_E$, $N_E$, which relationship is represented by a stored data map. The electricity generating efficiency $\eta_{GEN}$ may be obtained on the basis of the regenerative braking torque and the motor speed $N_M$ and according to a predetermined relationship between the efficiency $\eta_{GEN}$ and these values, which relationship is represented by a stored data map. The charging efficiency $\eta_{BIN}$ may be obtained on the basis of the charging amount SOC and the amount of electric energy to be stored in the device 22 per unit time (electric power) and according to a predetermined relationship between the efficiency $\eta_{BIN}$ and these values, which relationship is represented by a stored data map. The amount of electric energy to be stored per unit time corresponds to surplus power that is consumed by the engine 12 for the purpose of driving the electric motor 14 for charging the electric energy storage device 22. The data maps and equations necessary for calculating the electric generating efficiency $\eta_{GEN}$ and charging efficiency $\eta_{BIN}$ are stored in the memory means 36.

Referring to the flow chart of FIG. 3, there will be described an operation of the controller 26, by way of example.

The routine of FIG. 3 is executed with a predetermined cycle time, and is initiated with step S1 in which the controller 26 reads input signals indicative of the engine speed $T_E$, motor torque $T_M$, accelerator pedal operating amount $\theta_A$, engine speed $N_E$, motor speed $N_M$, transmission output speed $N_O$ and charging amount SOC. Step S1 is followed by step S2 to determine whether the charging amount SOC is equal to or larger than the predetermined threshold "A", which is the lower limit of the electric energy stored in the electric energy storage device 22, that is necessary to run the vehicle in the MOTOR DRIVE mode in which the motor 14 is selected as the drive power source. If an affirmative decision (YES) is obtained in step S2, the control flow goes to step S3 and the subsequent steps. If a negative decision (NO) is obtained in step S2, the control flow goes to step S7 in which a sub-routine for running the vehicle in the ELECTRICITY GENERATING DRIVE mode is executed as illustrated in the flow chart of FIG. 4 is executed.

Step S3 is implemented by the first calculating means 30 and the second calculating means 32 of the drive source selecting means 28 illustrated in FIG. 2, for calculating the fuel consumption amounts $M_{fce}$ and $M_{fcm}$, respectively. Step S3 is followed by step S4 which is implemented by the comparing means 34 to determine whether the fuel consumption amount $M_{fcm}$ is smaller than the fuel consumption amount $M_{fce}$. If the fuel consumption amount $M_{fcm}$ is smaller than the fuel consumption amount $M_{fce}$, the control flow goes to step S6 in which a sub-routine for running the vehicle in the MOTOR DRIVE mode is executed. If the fuel consumption amount $M_{fcm}$ is larger than the fuel consumption amount $M_{fce}$, the control flow goes to step S5 in which a sub-routine for running the vehicle in the ENGINE DRIVE mode is executed. The selection of the ENGINE DRIVE mode and the MOTOR DRIVE mode in step S4 permits the vehicle to be run with the minimum fuel consumption $M_{fc}$ of the engine 12. Where the fuel consumption amounts $M_{fcm}$ and $M_{fce}$ are identical with each other, either the ENGINE DRIVE mode or the MOTOR DRIVE mode may be selected. In the present embodiment, however, the ENGINE DRIVE mode is selected.

Figure 7:
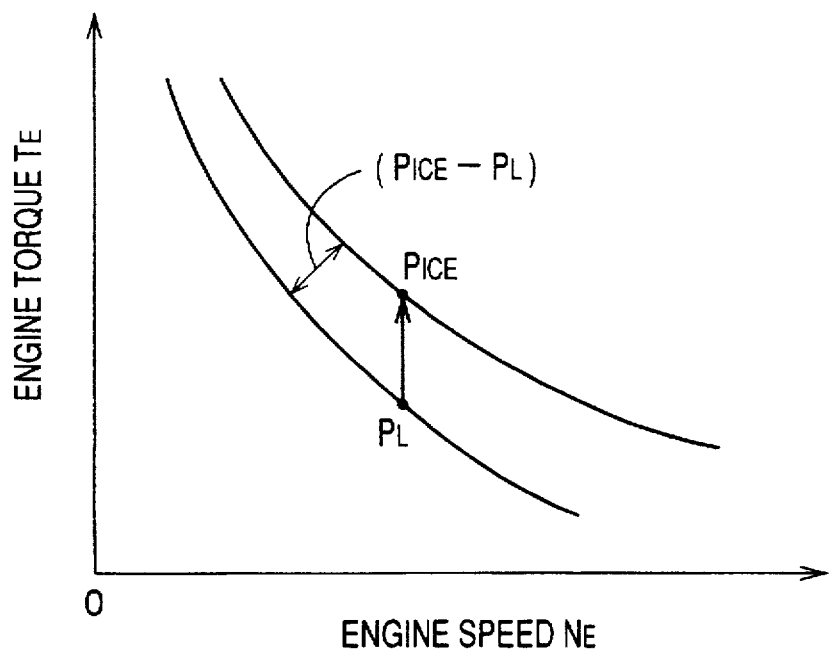
FIG. 7 is a graph indicating a relationship between engine output $P_{ICE}$ and surplus power $(P_{ICE}-P_L)$ used in the sub-routine of FIG. 4.

The ELECTRICITY GENERATING DRIVE mode sub-routine in step S7 of the routine of FIG. 3 corresponds to means for determining the output of the engine 12 during charging of the electric energy storage device 22. This sub-routine is executed as illustrated in the flow chart of FIG. 4. The sub-routine is initiated with step R1 in which a candidate value of the output or power $P_{ICE}$ of the engine 12 is determined to be equal to the required drive power $P_L$, in the first cycle of execution of the sub-routine, that is, when the sub-routine is executed for the first time. In the second and subsequent cycles of execution of the sub-routine of FIG. 4, the candiate value of the engine output $P_{ICE}$ is incremented by a predetermined increment amount $\Delta P_{ICE}$ in step R1. Since the engine speed $N_E$ is held constant depending upon the vehicle running speed, the engine torque $T_E$ increases by an amount corresponding to the increment amount $\Delta P_{ICE}$ as indicated in FIG. 7. Therefore, the surplus torque value of the engine 12 is obtained as a sum of the increment amounts $\Delta P_{ICE}$ in repeated implementation of step R1, that is, as a difference ($P_{ICE}-P_L$) between the candidate value of the engine output $P_{ICE}$ and the required drive power $P_L$. The graph of FIG. 7 shows iso-drive power lines of the engine 12, which indicate that the engine torque $T_E$ for obtaining the same drive power changes with the engine speed $N_E$. The engine output $P_{ICE}$ and the required drive power $P_L$ are determined by the specific combination of the current engine speed $N_E$ and torque $T_E$. Although the increment amount $\Delta P_{ICE}$ is a predetermined fixed value in the present embodiment, the increment amount $\Delta P_{ICE}$ may be changed depending upon the running condition of the vehicle, for example, depending upon the required drive power $P_L$. The engine torque $T_E$ may be changed by a predetermined increment.

Step R1 is followed by step R2 to calculate the fuel consumption rate $\eta_{ICE}$ on the basis of the engine output $P_{ICE}$ and according to the stored predetermined relationship between $h_{ICE}$ and $P_{ICE}$ as shown in FIG. 5. Then, the control flow goes to step R3 to calculate an overall fuel consumption efficiency $\eta_T$ of a system which is assigned to charge the electric energy storage device 22 by operation of the electric motor 14 by the surplus power ($P_{ICE}-P_L$) of the engine 12. The calculation of the overall fuel consumption efficiency $\eta_T$ is effected according to the following equation (3), and the calculated efficiency $\eta_T$ is stored in the memory means 36.

$$\eta_T = \eta_{GEN} \times \eta_{BIN} \times \eta_{BOUT} \times \eta_{MOT} \times \eta_{ICE} + (P_L/P_{ICE}) \times \eta_{ICE} \times (1-\eta_{GEN} \times \eta_{BIN} \times \eta_{BOUT} \times \eta_{MOT}) \quad (3)$$

The present embodiment is adapted to obtain the overall fuel consumption efficiency $\eta_T$ as a ratio of the fuel consumption amount Mfc to the output or power of the electric motor 14 when the motor 14 is driven by the electric energy which has been stored in the electric energy storage device 22 by operation of the motor 14 by the surplus power ($P_{ICE}-P_L$) of the engine 12.

The electricity generating efficiency $\eta_{GEN}$ used in the above equation (3) is obtained according to the data map stored in the memory means 36, depending upon the surplus power ($P_{ICE}-P_L$), that is, depending upon the speed and surplus torque (regenerative braking torque), while the charging efficiency $\eta_{BIN}$ is obtained according to the data map also stored in the memory means 36, depending upon the surplus power ($P_{ICE}-P_L$) and the charging amount SOC. The discharging efficiency $\eta_{BOUT}$ and the motor driving efficiency $\eta_{MOT}$ used in the equation (3) are obtained in the MOTOR DRIVE mode and stored in the memory means 36. For instance, averages (e.g., moving averages) of the efficiency $\eta_{BOUT}$, $\eta_{MOT}$ in two or more previous vehicle runs in the MOTOR DRIVE mode are stored in the memory means 36. Alternatively, values of $\eta_{BOUT}$, $\eta_{MOT}$ in the last vehicle run in the MOTOR DRIVE mode are stored in the memory means 36. These values stored in the memory means 36 are used as the efficiency values $\eta_{BOUT}$ and $\eta_{MOT}$ in the equation (3) to calculate the overall fuel consumption efficiency $\eta_T$. In the MOTOR DRIVE mode, the discharging efficiency $\eta_{BOUT}$ is obtained on the basis of the required drive power $P_L$ and the charging amount SOC and according to a predetermined relationship between the efficiency $\eta_{BOUT}$ and the values $P_L$ and SOC, which relationship is represented by the data map stored in the memory means 36. The motor driving efficiency $\eta_{MOT}$ is obtained on the basis of the required drive power $P_L$, namely, on the basis of the motor speed $N_M$ and torque $T_M$ and according to a predetermined relationship between the efficiency $\eta_{MOT}$ and the values $N_M$, $T_M$, which relationship is represented by the data map stored in the memory means 36.

Then, the control flow goes to step R4 to determine whether the engine output $P_{ICE}$ is larger than a predetermined threshold $P_E$. Steps R1-R4 are repeatedly implemented until an affirmative decision (YES) is obtained in step R4, that is, until the engine output $P_{ICE}$ exceeds the threshold $P_E$. While this threshold $P_E$ may be a predetermined fixed value, it may be changed depending upon the required drive power $P_L$ and according to a predetermined relationship between the threshold $P_E$ and the power $P_L$, so as to prevent overrunning of the engine 12 and motor 14. This relationship is represented by a data map stored in the memory means 36. Steps R1 through R4 correspond to means for repeatedly calculating the overall fuel consumption efficiency values $\eta_T$ which reflect the electricity generating efficiency $\eta_{GEN}$ of the motor 14 and the charging efficiency $\eta_{BIN}$ of the electric energy storage device 22 upon charging of the device 22 by the surplus power ($P_{ICE}-P_L$), while changing the surplus power ($P_{ICE}-P_L$) or while changing the candidate value of the engine output $P_{ICE}$. The overall efficiency values $\eta_T$ calculated in step R3 correspond to the respective candiate values of the engine output $P_{ICE}$ obtained in step R1. As described above, the present embodiment is adapted to obtain the overall fuel consumption efficiency $\eta_T$ while taking into account the efficiency of operation of the motor 14 by the electric energy stored in the electric energy storage device 22, as well as the efficiency of charging of the device 22 by operation of the motor 14 (as the electric generator) by the surplus power ($P_{ICE}-P_L$) of the engine 12. However, the efficiency of charging of the device 22 may be obtained in step R3, so that the obtained charging efficiency is substituted for the overall fuel consumption efficiency $\eta_T$.

When the affirmative decision (YES) is obtained in step R4, the control flow goes to step R5 to select one of the engine output candidate values $P_{ICE}$ obtained in step R1, which corresponds to the highest overall fuel consumption efficiency value $\eta_T$. The highest overall fuel consumption efficiency value $\eta_T$ means the lowest ratio of the fuel consumption amount Mfc to the output or power of the motor 14 during operation of the motor 14 by the electric energy which has been stored in the electric energy storage device 22 by operation of the motor 14 by the surplus power ($P_{ICE}-P_L$). Since the discharging efficiency $\eta_{BOUT}$ and the motor driving efficiency $\eta_{MOT}$ in the above equation (3) remain unchanged with a change in the engine output $P_{ICE}$, the engine output value $P_{ICE}$ whose ratio of the fuel consumption amount Mfc to the amount of the electric energy to be stored in the device 22 is the lowest is selected in step R5. Then, the control flow goes to step R6 wherein the engine 12 is operated so as to provide the selected engine output $P_{ICE}$, and electricity generating power $P_{GEN}$ given to the motor 14 to charge the device 22 is determined to be equal to the surplus power ($P_{ICE}-P_L$). Further, the regenerative braking torque of the motor 14 is determined depending upon the surplus power ($P_{ICE}-P_L$). In the ELECTRICITY GENERATING DRIVE mode, therefore, the vehicle is run by the engine 12 as the drive power source while the motor 14 is operated by the engine 12 to charge the electric energy storage device 22 so as to minimize the ratio of the fuel consumption amount Mfc to the electric energy to be stored. It will be understood that steps R5 and R6 correspond to means for selecting one of the candidate values of the engine output $P_{ICE}$ which corresponds to the highest one of the overall fuel consumption efficiency values $\eta_T$ obtained in step R3, and determining the selected candidate value as the desired engine output $P_{ICE}$. Thus, the engine output candidate value $P_{ICE}$ which satisfies a predetermined condition is eventually determined as the desired engine output $P_{ICE}$.

The present vehicle drive control apparatus 10 according to the present embodiment of the invention is adapted to select the ENGINE DRIVE mode or the MOTOR DRIVE mode, depending upon whether the fuel consumption amount $M_{fcm}$ is smaller than the fuel consumption amount $M_{fce}$, more specifically, to select the MOTOR DRIVE mode if the fuel consumption amount $M_{fcm}$ is smaller than the fuel consumption amount $M_{fce}$, and select the ENGINE DRIVE mode if the fuel consumption amount $M_{fcm}$ is not smaller than the fuel consumption amount $M_{fce}$. In this respect, it is noted that the fuel consumption amount $M_{fcm}$ in the MOTOR DRIVE mode reflects the electricity generating efficiency $\eta_{GEN}$ and driving efficiency $\eta_{MOT}$ of the motor 14 and the charging $\eta_{BIN}$ and discharging efficiency $\eta_{BOUT}$ of the electric energy storage device 22. In other words, the fuel consumption amount $M_{fcm}$ can be determined with high accuracy on the basis of the above-indicated efficiency values, whereby the selection of the ENGINE DRIVE or MOTOR DRIVE mode for minimizing the fuel consumption amount Mfc can be achieved with high accuracy. This arrangement permits the vehicle to run with the fuel consumption amount Mfc substantially kept at a minimum value.

In the ELECTRICITY GENERATING DRIVE mode in which the vehicle is run by the engine 12 while the motor 14 is operated by the surplus power ($P_{ICE}-P_L$) of the engine 12 to charge the electric energy storage device 22, the engine output $P_{ICE}$ is determined so as to maximize the overall fuel consumption efficiency $\eta_T$ which reflects the energy conversion efficiencies $\eta_{GEN}$ and $\eta_{BIN}$ of the motor 14 and device 22, that is, to minimize the ratio of the fuel consumption amount Mfc to the output or power of the motor 14 during operation of the motor 14 by the electric energy which has been stored in the device 22 by the surplus power ($P_{ICE}-P_L$). The motor 14 is operated by the electricity generating power $P_{GEN}$ which corresponds to the surplus power ($P_{ICE}-P_L$), which in turn is equal to the determined engine output $P_{ICE}$ minus the required drive power $P_L$. Since the ratio of the fuel consumption amount Mfc to the output of the motor 14 during operation of the motor 14 by the electric energy stored in the device 22 by the surplus power ($P_{ICE}-P_L$) is reduced to a minimum, the fuel consumption amount Mfc per unit amount of electric energy to be stored in the device 22 is accordingly minimized, leading to maximum efficiency of charging of the device 22.

As explained above, the present vehicle drive control apparatus 10 is adapted to run the vehicle selectively in the ENGINE DRIVE mode or MOTOR DRIVE mode so as to minimize the fuel consumption amount Mfc, and in the ELECTRICITY GENERATING DRIVE mode in which the engine output $P_{ICE}$ (including the surplus power) and the electricity generating power $P_{GEN}$ are determined so as to minimize the fuel consumption amount Mfc per unit amount of electric energy to be stored in the electric energy storage device 22, namely, so as to maximize the overall fuel consumption efficiency $\eta_T$, so that the overall fuel consumption amount Mfc for running the vehicle is considerably reduced, and the exhaust gas amount corresponding to the fuel consumption amount is accordingly reduced.

In the above embodiment, the power transmission efficiency of the transmission 16 is not taken into account for obtaining the fuel consumption amounts $M_{fce}$, $M_{fcm}$ and the overall fuel consumption efficiency $\eta_T$. Where the transmission 16 is capable of changing the speed ratio in steps or continuously, however, the power transmission efficiency of the transmission 16 varies with the speed ratio, and the fuel consumption amounts $M_{fce}$, $M_{fcm}$ and the overall fuel consumption efficiency $\eta_T$ vary with the speed ratio and power transmission efficiency of the transmission 16. In the light of this fact, it is desirable to obtain those values $M_{fce}$, $M_{fcm}$, $\eta_T$ according to the following equations (4), (5) and (6), which include power transmission efficiency $\eta_{CVT}$ of the transmission 16 where the transmission 16 is a continuously variable transmission. The power transmission efficiency $\eta_{CVT}$ is obtained on the basis of appropriate parameters such as the speed ratio, transmission torque and input and output speeds of the transmission 16, and according to a predetermined relationship of the efficiency hCVT and those parameters, which relationship is represented by a data map stored in the memory means 36, together with other data (e.g., equations) necessary to calculate the power transmission efficiency $\eta_{CVT}$.

$$M_{fce} = Fce \times P_L/\eta_{CVT} \tag{4}$$

$$M_{fcm} = Fcm \times P_L/(\eta_{GEN} \times \eta_{BIN} \times \eta_{BOUT} \times \eta_{MOT} \times \eta_{CVT}) \tag{5}$$

$$\eta_T = \eta_{GEN} \times \eta_{BIN} \times \eta_{BOUT} \times \eta_{MOT} \times \eta_{CVT}^* \times \eta_{ICE} + \tag{6}$$
$$(P_L/P_{ICE}) \times \eta_{ICE} \times \{1 - (h_{GEN} \times \eta_{BIN} \times \eta_{BOUT} \times$$
$$\eta_{MOT} \times \eta_{CVT}^* \times \eta_{CV4T}^*)/\eta_{CVT}\}$$

As described above, the power transmission efficiency $\eta_{CVT}$ in the above equations (4), (5) and (6) is obtained on the basis of the current running condition of the vehicle such as the transmission torque and speed ration of the transmission 16 which correspond to the required drive power $P_L$, and according to the data map stored in the memory means 36. Like the discharging efficiency $\eta_{BOUT}$ and the motor driving efficiency $\eta_{MOT}$, the power transmission efficiency $\eta_{CVT}^*$ in the above equation (6) is an average (e.g., moving average) of the values stored in the memory means 36 in the previous vehicle runs in the MOTOR DRIVE mode, or a value stored in the memory means 36 in the last vehicle run in the MOTOR DRIVE mode.

Figure 8:
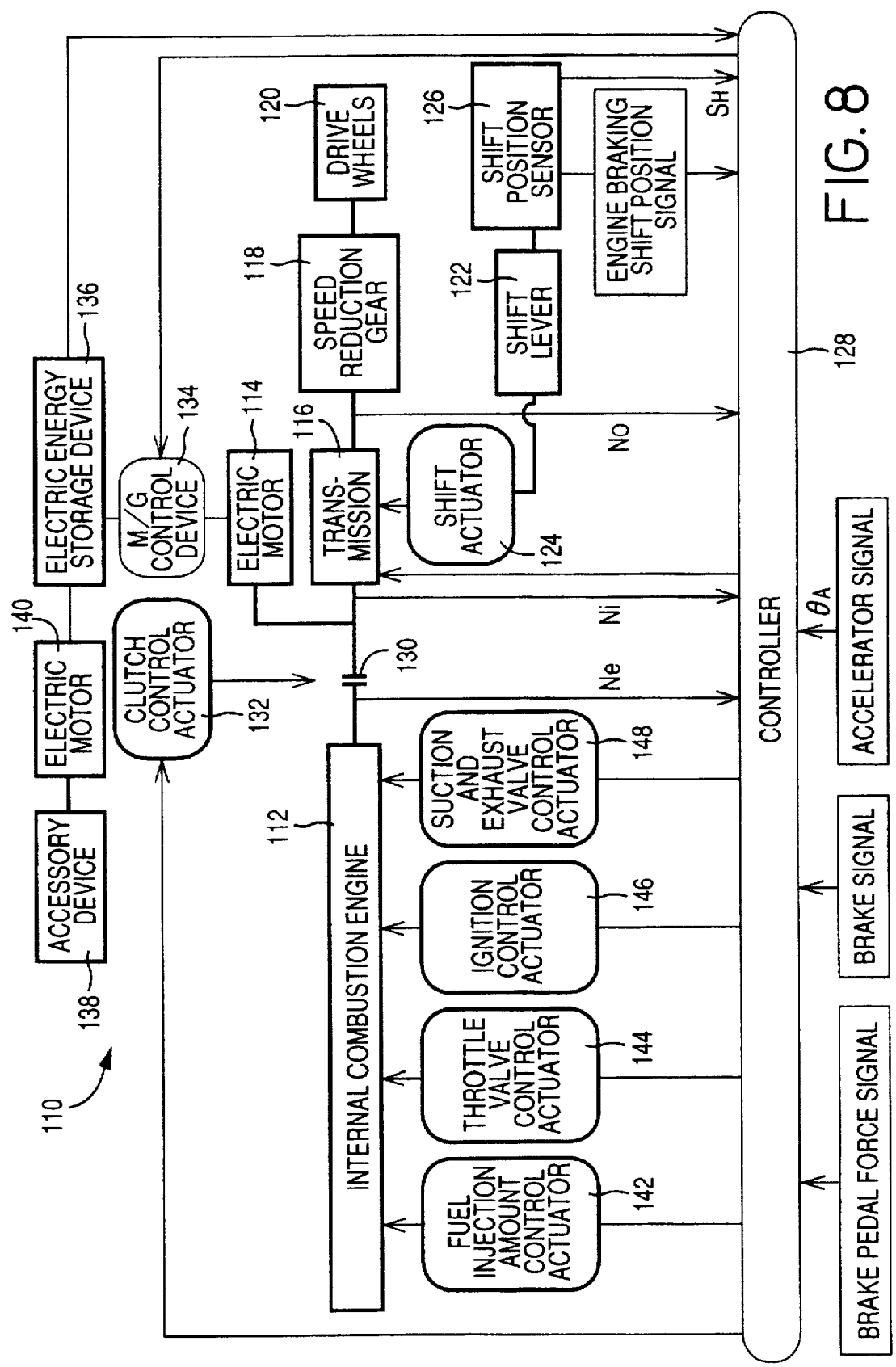
FIG. 8 is a block diagram illustrating an arrangement of a vehicle drive control apparatus constructed according to another embodiment of this invention.

Referring to the block diagram of FIG. 8, there will be described a vehicle drive control apparatus 110 constructed according to a second embodiment of the present invention. The apparatus 110 is substantially similar to the apparatus 10 of the first embodiment of FIG. 1. In FIG. 8, thick solid lines indicate mechanical connection of elements, while thin solid lines indicate electrical connection of elements.

The vehicle drive control apparatus 110 is arranged to control a hybrid vehicle equipped with an internal combustion engine 112 such as a gasoline engine operated by combustion of a fuel, and a dynamo-electric motor 114 which functions as an electric motor operated by an electric energy and an electric generator or dynamo for generating electricity. Power of the internal combustion engine 112 and power of the electric motor 114 are simultaneously or selectively transferred to a transmission 116, and to right and left drive wheels 120 via a speed reduction gear 118 and a differential gear. The transmission 116 has a forward/reverse switching mechanism having a forward drive position FWD, a reverse drive position REV, and a neutral position N, and a speed changing mechanism having a plurality of forward drive positions having different speed ratios. With a shift lever 122 operated by the vehicle operator, a shift actuator 124 is operated to place the transmission 116 in a selected one of the forward drive, reverse drive and neutral positions FWD, REV, N. The shift lever 122 has a parking position P, a reverse position R, a neutral position N, a drive position D, a second-speed position 2 and a low-speed position L. A shift position sensor 126 is provided to detect the currently selected position $S_H$ of the shift lever 122. An output signal of this shift position sensor 126 is fed to a controller 128, so that the transmission 116 is controlled depending upon the currently selected position $S_H$ of the shift lever 122. When the shift lever 122 is placed in the drive position D, the transmission 116 may be placed in any one of the forward drive positions. When the shift lever 122 is placed in the second-speed position 2 or low-speed position L, the forward drive positions in which the transmission may be placed are limited to the positions having relatively large speed ratios. A clutch 130 is disposed between the engine 112 and the transmission 116, for connecting and disconnecting the engine 112 and transmission 116. The clutch 130 is engaged and released by a clutch control actuator 132. The clutch 130 is normally placed in the fully engaged state.

The dynamo-electric motor 114 is connected to an electric energy storage device (electric power supply device) 136 in the form of a battery or condenser, for example, through a motor/generator control device (hereinafter abbreviated as "M/G control device) 134 so that the motor 114 is selectively placed in a DRIVE state, a CHARGING state, and a NON-LOAD state. In the DRIVE state, the motor 114 is driven by an electric energy supplied from the electric energy storage device 136. In the CHARGING state, the motor 114 functions as an electric generator or dynamo, with regenerative braking (braking torque electrically generated by the motor 114 itself), for storing an electric energy in the electric energy storage device 136. In the NON-LOAD state, the output shaft of the motor 114 is permitted to rotate freely. The engine 112 is controlled by a fuel injection amount control actuator 142, a throttle valve control actuator 144, an ignition control actuator 146 and a suction and exhaust valve control actuator 148. These actuators 142, 144, 146, 148 and the M/G control device 134 are controlled by a controller 128. The electric energy storage device 136 is also connected to an electric motor 140 for driving an accessory device 138 such as a compressor of an air conditioner.

The controller 128 includes a microcomputer incorporating a central processing unit (CPU), a random-access memory (RAM), and a read-only memory (ROM). The CPU operates according to control programs stored in the ROM while utilizing a temporary data storage function of the RAM. The controller 128 has various functions as illustrated in the block diagram of FIG. 9. The controller 128 is supplied with input signals from various detecting devices. These input signals include signals indicative of a speed Ne of the engine 112, an input speed Ni of the transmission 116 (speed of the motor 114), an output speed No of the transmission 116 (which corresponding to the running speed V of the vehicle), and a charging amount SOC of the electric energy storage device 136. The input signals include: an ACCELERATOR signal indicative of an operating amount $\theta_A$ of an accelerator pedal of the vehicle; a BRAKE signal indicating that a brake pedal of the vehicle has been depressed; a BRAKE PEDAL FORCE signal indicative of a force acting on the brake pedal; and ENGINE BRAKING SHIFT POSITION signal indicating that the shift lever 122 is placed in any one of engine braking shift positions, that is, in any one of the drive, second-speed and low-speed positions D, 2, L in which engine braking may be applied to the vehicle. The charging amount SOC of the electric energy storage device 136 may be determined on the basis of a current of the motor 114 during operation thereof as an electric generator to charge the device 136, or on the basis of the charging efficiency of the device 136.

Figure 9:
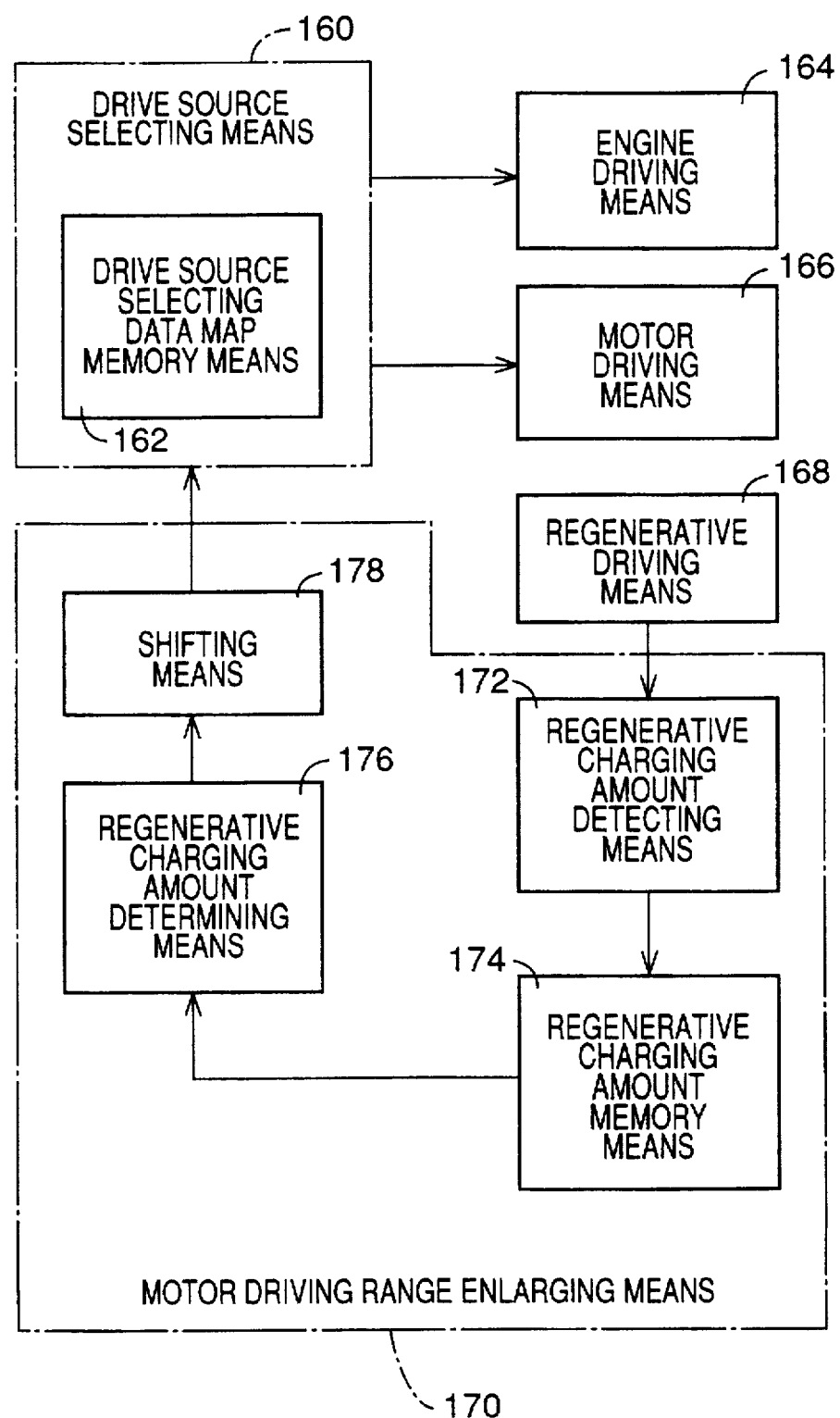
FIG. 9 is a block diagram illustrating the functions achieved by a portion of a controller used in the vehicle drive control apparatus of FIG. 8.
Figure 11:
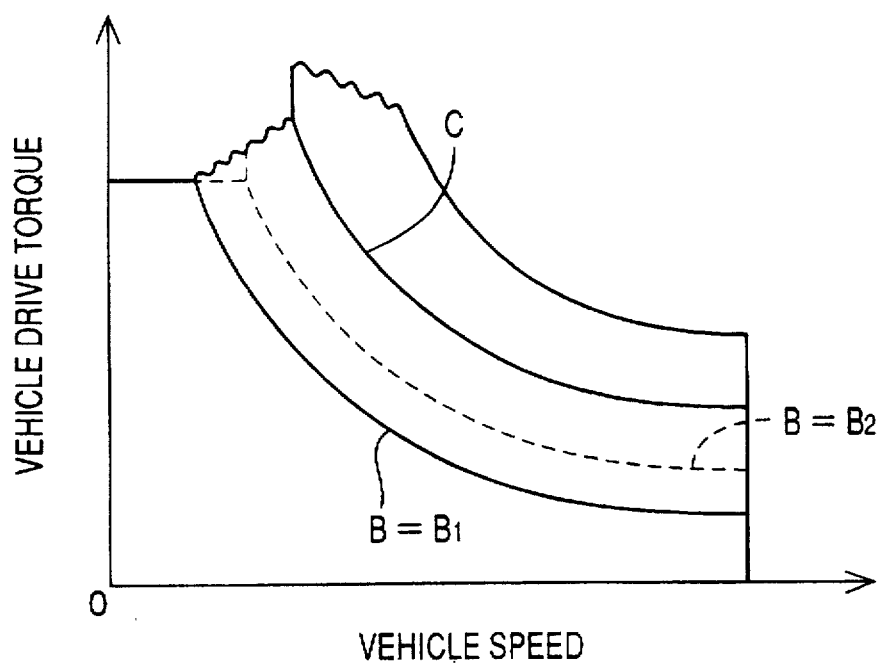
FIG. 11 is a graph indicating thresholds B1, B2 and C used in the routine of FIG. 10.

The controller 128 includes drive source selecting means 160 illustrated in the block diagram of FIG. 9. The drive source selecting means 160 is adapted to select one or both of the engine 112 and the motor 114 as the drive power source or sources, according to a drive source selecting data map stored in memory means 162. That is, the controller 128 has a MOTOR DRIVE mode in which the motor 114 is selected as the drive power source, an ENGINE DRIVE mode in which the engine 112 is selected as the drive power source, and an ENGINE-MOTOR DRIVE mode in which both the engine 112 and the motor 114 are selected as the drive power sources. An example of the drive source selecting data map is illustrated in the graph of FIG. 11, which represents a predetermined relationship between the vehicle drive torque and running speed V and the above-indicated three drive modes. The drive source selecting data map is provided for each of the drive positions of the transmission 116. A first boundary line B (B1 or B2) and a second boundary line C in Fig. define three ranges corresponding to the MOTOR DRIVE mode, ENGINE DRIVE mode and ENGINE≦MOTOR DRIVE mode. Described more specifically, the drive source selecting means 160 selects the MOTOR DRIVE mode when the vehicle running condition as represented by the current vehicle drive torque and speed V is held within the range below the first boundary line B. When the vehicle running condition is held within the range between the first and second boundary lines B and C, the drive source selecting means 160 selects the ENGINE DRIVE mode. When the vehicle running condition is in the range above the second boundary line C, the drive source selecting means 160 selects the ENGINE-DRIVE mode. As described below, the first boundary line B is normally located at B1, but may be shifted to B2 so as to enlarge the range in which the MOTOR DRIVE mode is selected. The data map representative of the two boundary lines B1 and C (solid boundary lines) is formulated such that the MOTOR DRIVE mode is selected if the fuel consumption amount $M_{fcm}$ in an ELECTRICITY GENERATING DRIVE mode (which will be described) is smaller than the fuel consumption amount $M_{fce}$ in the ENGINE DRIVE mode, while the ENGINE DRIVE mode is selected if the fuel consumption amount $M_{fce}$ is smaller than the fuel consumption amount $M_{fce}$, as in the first embodiment. The fuel consumption amount $M_{fcm}$ in the ELECTRICITY GENERATING DRIVE mode is calculated while taking into account the electricity generating efficiency $\eta_{GEN}$, charging efficiency $\eta_{BIN}$, discharging efficiency $\eta_{BOUT}$ and motor driving efficiency $\eta_{MOT}$, as described above with respect to the first embodiment. It will be understood that the drive source selecting means corresponds to the drive source selecting means 28 of the first embodiment.

The controller 128 further includes engine driving means 164 for running the vehicle by operation of the engine 112 in the ENGINE DRIVE mode, motor driving means 166 for running the vehicle by operation of the motor 114 in the MOTOR DRIVE mode, and regenerative driving means 168 for running the vehicle in a REGENERATIVE DRIVE mode in which the motor 114 is driven by a kinetic energy of the running vehicle so as to store an electric energy in the electric energy storage device 136 as well as to apply a brake to the vehicle. The controller 128 further includes motor driving range enlarging means 170 for enlarging the motor driving range within which the vehicle is run in the MOTOR DRIVE mode under the control of the motor driving means 166, if a regenerative charging amount $SOC_R$ is larger than a predetermined threshold. The regenerative charging amount $SOC_R$ is an amount of electric energy to be stored in the electric energy storage device 136 in the REGENERATIVE DRIVE mode under the control of the regenerative driving means 168. The motor driving range enlarging means 170 includes: regenerative charging amount detecting means 172 for detecting the regenerative charging amount $SOC_R$; regenerative charging amount memory means 174 in the form of a register, for example, for storing the detected regenerative charging amount values $SOC_R$ for a predetermined time duration or during running of the vehicle by a predetermined distance; regenerative charging amount determining means 176 for determining whether a sum $SOC_{RT}$ of the regenerative charging amount values $SOC_R$ stored in the memory means 174 is equal to or larger than a predetermined reference value D, or whether a regeneration ratio $SOC_{RT}/SOC$ is equal to or larger than a predetermined reference value E; and shifting means 178 for shifting the first boundary line B from the normal position B1 to enlarging position B2 to enlarge the motor driving range, if an affirmative decision is obtained by the regenerative charging amount determining means 176. The shifted first boundary line B2 indicated by dashed line in FIG. 11 is located below the second boundary line C. Thus, the present motor driving range enlarging means 170 is adapted to enlarge the range in which the vehicle is run in the MOTOR DRIVE mode. The shifted first boundary line B2 may be determined so as to satisfy a predetermined condition, for example, so that the vehicle can be run in the MOTOR DRIVE mode (with the motor 114 selected as the drive power source) at a predetermined velocity Y (km/h) or higher under a given running condition (e.g., running on a road surface having a given gradient X°).

Figure 10:
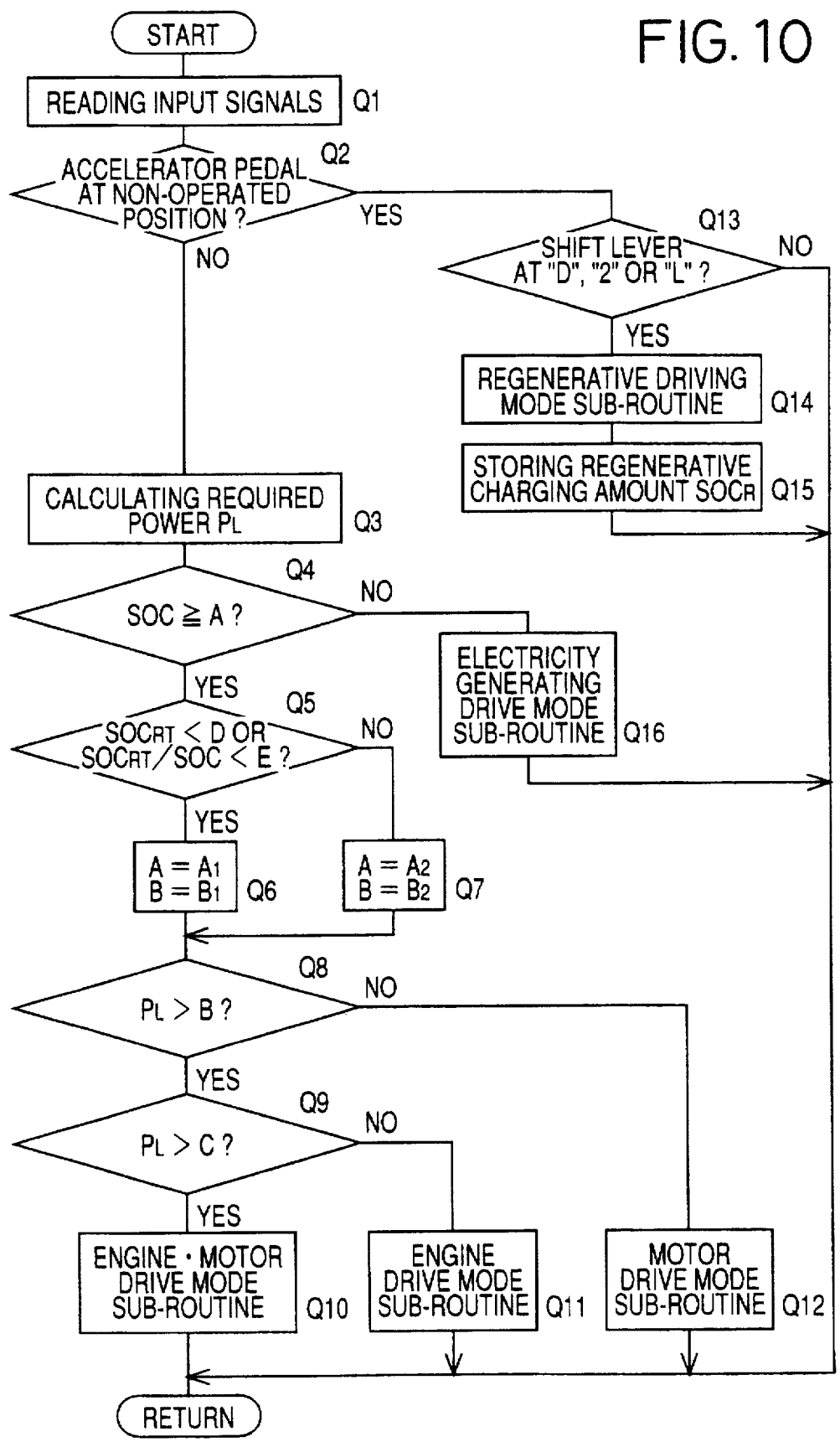
FIG. 10 is a flow chart showing a routine executed by the vehicle drive control apparatus of FIG. 8.

Referring next to the flow chart of FIG. 10, there will be described an operation of the controller 128 which includes the various functional means shown in FIG. 9. A control routine of FIG. 10 is initiated with step Q1 to read various input signals including the signals indicative of the operating amount $\theta_A$ of the accelerator pedal, engine speed Ne, transmission input and output speeds Ni, No, charging amount SOC, engine torque $T_E$, motor torque $T_M$ and currently selected position $S_H$ of the shift lever 126. The engine torque $T_E$ may be obtained from the opening angle of the throttle valve or the fuel injection amount, while the motor torque $T_M$ may be obtained from a current flowing through the motor 114. Step Q1 is followed by step S2 to determine whether the accelerator pedal is placed at a fully retracted or non-operated position, namely, whether the operating amount $\theta_A$ of the accelerator pedal is substantially zero or not. If an affirmative decision (YES) is obtained in step Q2, the control flow goes to step Q13 to determine whether the currently selected position $S_H$ of the shift lever 126 is any one of the engine braking shift positions D, 2, L. If an affirmative decision (YES) is obtained in step Q13, the control flow goes to step Q14 in which a sub-routine for running the vehicle in the REGENERATIVE DRIVE mode is executed under the control of the regenerative driving means 168 so that the motor 114 is driven by the kinetic energy of the running vehicle to charge the electric energy storage device 136 while a brake is applied to the vehicle. The regenerative braking torque of the motor 114 in this sub-routine is controlled depending upon the running condition of the vehicle, such as the vehicle running speed V and the brake pedal depression force. It will be understood that the REGENERATIVE DRIVE mode is selected when the accelerator pedal is placed at its non-operated position and when the shift lever 122 is placed in any one of the engine braking shift positions. That is, the affirmative decision (YES) in steps Q2 and Q13 is the requirement that should be satisfied to select the REGENERATIVE DRIVE mode. However, the requirement that should be satisfied to select the REGENERATIVE DRIVE mode may be suitably changed or determined. For instance, a result of determination as to whether the brake pedal has been depressed or not may be additionally used to determine whether the REGENERATIVE DRIVE mode should be selected or not.

Then, the control flow goes to step Q15, which is implemented by the regenerative charging amount detecting means 172 to detect the regenerative charging amount $SOC_R$ of the electric energy storage device 136 in the REGENERATIVE DRIVE mode. The detection of the amount $SOC_R$ is based on the current of the motor 114 and the charging efficiency $\eta_{BIN}$ of the device 136. The detected amount $SOC\eta_R$ is stored in the memory means 174. The charging efficiency $\eta_{BIN}$ may be obtained on the basis of the charging amount SOC and according to a predetermined relationship between the efficiency $\eta_{BIN}$ and the charging amount SOC, which relationship is represented by a data map stored in a suitable memory means such as the RAM of the controller 128. As indicated above, the regenerative charging amount memory means 174 stores the sum $SOC_{RT}$ of the regenerative charging amount values $SOC_R$ which have been detected for the predetermined time duration or during vehicle running by the predetermined distance. Namely, a predetermined number of the data values $SOC_R$ are always stored in the memory means 174 such that the oldest data value is erased each time the new data value is stored in step Q15, so that the sum $SOC_{RT}$ is updated with the vehicle running time or distance.

If a negative decision (NO) is obtained in step Q2, that is, if the operating amount $\theta_A$ of the accelerator pedal is not substantially zero, the control flow goes to step Q3 to calculate the required drive power $P_L$ on the basis of the operating amount $\theta_A$ or a rate of change of this operating amount $\theta_A$ and the vehicle running speed V, according to a suitable equation or data map stored in the controller 128, as in the first embodiment. Step Q3 is followed by step Q4 to determine whether the charging amount SOC of the electric energy storage device 136 is equal to or larger than a predetermined lower limit A or not. If an affirmative decision (YES) is obtained in step Q4, the control flow goes to step Q5 and the subsequent steps. If a negative decision (NO) is obtained in step Q4, the control flow goes to step Q16 in which a sub-routine for running the vehicle in the ELECTRICITY GENERATING DRIVE mode is implemented. The lower limit A used in step Q4 is the minimum amount of electric energy stored in the electric energy storage device 136, which minimum amount is required for running the vehicle in the MOTOR DRIVE mode in which the motor 114 is selected as the drive power source. The lower limit A is usually determined on the basis of the charging and discharging efficiencies $\eta_{BIN}$ and $\eta_{BOUT}$, and is initially set at a standard value A1 which is about 70% of the nominal capacity of the device 136, for example. In the sub-routine of step Q16 implemented if the negative decision (NO) is obtained in step Q4, the engine 112 is operated to provide a total output $P_{ICE}$ not smaller than the required drive power $P_L$, so that the vehicle is driven by the required drive power $P_L$ while the motor 114 is operated as the electric generator by the surplus power $(P_{ICE}-P_L)$ to charge the electric energy storage device 136, as in the first embodiment. Step Q16 is implemented in the same manner as step S7 of the first embodiment.

If the affirmative decision (YES) is obtained in step Q4, the control flow goes to step Q5, which is implemented by the regenerative charging amount determining means 176, to determine whether the sum $SOC_{RT}$ of the regenerative charging amount values $SOC_R$ stored in the memory means 174 is smaller than the reference value D, or whether the ratio $SOC_{RT}/SOC$ is smaller than the reference value E. If an affirmative decision (YES) is obtained in step Q5, that is, if $SOC_{RT}<D$ and/or if $SOC_{RT}/SOC<E$, step Q6 is implemented to determine the lower limit A at the standard value A1 and locate the first boundary line B at the normal position B1. If a negative decision (NO) is obtained in step Q5, that is if $SOC_{RT} \geq D$ and/or if $SOC_{RT}/SOC \geq E$, step Q7 is implemented to reduce the lower limit A from the standard value A1 to a smaller value A2 and shift the first boundary line B from the normal position B1 to the motor driving range enlarging position B2. Accordingly, the range of the vehicle running condition in which the vehicle is run in the MOTOR DRIVE mode by operation of the motor 114 is enlarged, and the vehicle is more likely to be run in the ENGINE DRIVE, MOTOR DRIVE or ENGINE-MOTOR DRIVE mode in the following step Q10, Q11 or Q12, while the vehicle is less likely to be run in the ELECTRICITY GENERATING DRIVE mode in step Q16, since the lower limit A is reduced to from the standard value A1 to the smaller value A2. This arrangement is advantageous to effectively utilize the electric energy stored in the electric energy storage device 136 during running of the vehicle on a mountain path in which the sum $SOC_{RT}$ of the regenerative charging amount values $SOC_R$ tends to be large. In the case where the motor driving range is enlarged in step Q7, it is desirable to change the shift pattern of the transmission 116 so that the changed shift pattern meets the MOTOR DRIVE mode.

Step Q6 and Q7 are followed by step Q8 to determine whether a point corresponding to the required drive power $P_L$ (determined by the current vehicle drive torque and speed V) is located above the first boundary line B. If an affirmative decision (YES) is obtained in step Q8, the control flow goes to step Q9 to determine whether the point of the required drive power $P_L$ is located above the second boundary line C. If a negative decision (NO) is obtained in step Q8, that is, if the point of the required drive power $P_L$ is located below the first boundary line B or in the motor driving range, the control flow goes to step Q12 in which a sub-routine for running the vehicle in the MOTOR DRIVE mode is executed. If the point of the required drive power $P_L$ is located above the first boundary line B and on or below the second boundary line C, that is, if a negative decision (NO) is obtained in step Q9, the control flow goes to step Q11 in which a sub-routine for running the vehicle in the ENGINE DRIVE mode is executed. If the point of the required drive power $P_L$ is located above the second boundary line, that is if an affirmative decision (YES) is obtained in step Q9, the control flow goes to step Q10 in which a sub-routine for running the vehicle in the ENGINE-MOTOR DRIVE mode is executed. The MOTOR DRIVE mode sub-routine of step Q12 is executed by the motor driving means 166 so that the vehicle is driven by operation of only the motor 114. The ENGINE DRIVE mode sub-routine of step Q11 is executed by the engine driving means 164 so that the vehicle is driven by operation of the only engine 112. The ENGINE-MOTOR DRIVE sub-routine of step Q10 is executed by the engine driving means 164 and the motor driving means 164 so that the vehicle is driven by operation of both the engine 112 and the motor 114. Steps Q8 and Q9 to select the driving mode of the vehicle depending upon the required drive power $P_L$ are implemented by the drive source selecting means 160. When the vehicle is operated in the ENGINE DRIVE mode in step Q11, the motor 114 is placed in a non-load condition. When the vehicle is operated in the MOTOR DRIVE mode in step q12, the clutch 130 is placed in the fully released state to disconnect the engine 112 and the motor 114 from each other.

In the present vehicle drive control apparatus 110, the range of the vehicle running condition in which the vehicle is driven in the MOTOR DRIVE mode by operation of only the motor 114 is enlarged by shifting the first boundary line B to the motor driving range enlarging position B2, if the sum $SOC_{RT}$ of the electric energy stored in the electric energy storage device 136 during running of the vehicle in the REGENERATIVE DRIVE mode in step Q14 is equal to or larger than the reference value D, or if the ratio $SOC_{RT}/SOC$ is equal to or larger than the reference value E. As a result of enlargement of the motor driving range, the amount of consumption of the electric energy by the motor 114 is increased. The present arrangement is effective to prevent excessive charging of the electric energy storage device 136 during running of the vehicle on a mountain path, thereby preventing reduction of the energy conversing efficiencies $\eta_{BIN}$ and $\eta_{BOUT}$ of the device 136 or a failure to charge the device 136. Further, the enlargement of the motor driving range results in reducing the frequency of operation of the engine 112, and consequent reduction of the fuel consumption by the engine 112 and the amount of exhaust gas emission from the engine 112.

The present second embodiment is adapted such that the first boundary line B defining the motor driving range and partially defining the engine driving range is shifted from the standard position B1 to the position B2 toward the second boundary line C, namely, such that a portion of the normal engine driving range in which the fuel economy of the engine 112 is relatively low is replaced by a portion of the enlarged motor driving range. Accordingly, the present arrangement is effective to reduce the fuel consumption and exhaust gas emission of the engine 112. Further, the first and second boundary lines B and C defining the motor driving range and the engine driving range are determined based on the electricity generating efficiency $\eta_{GEN}$, charging efficiency $\eta_{BIN}$, discharging efficiency $\eta_{BOUT}$ and motor driving efficiency $\eta_{MOT}$, as in the first embodiment, whereby the fuel consumption and exhaust gas amount are further effectively reduced.

While the presently preferred embodiments of this invention have been described in detail by reference to the accompanying drawings, it is to be understood that the present invention may be otherwise embodied.

In the first embodiment, the ENGINE DRIVE mode or the MOTOR DRIVE mode is selected so as to reduce the fuel consumption amount Mfc, and the engine 12 is controlled in the ELECTRICITY GENERATING DRIVE mode so as to maximize the overall fuel consumption efficiency $\eta_T$, whereby the fuel consumption amount Mfc is minimized and the exhaust gas amount is accordingly minimized. However, the exhaust gas amount of the engine 12 can be further reduced by replacing the fuel consumption rates Fcm, Fce in the above equations (1) through (6), by an exhaust gas emission rate (amount of the exhaust gases per unit power), or by replacing the fuel consumption efficiency $\eta_{ICE}$ by an exhaust gas emission efficiency (reciprocal of the exhaust gas emission rate). Further, the selection of the ENGINE DRIVE mode and the MOTOR DRIVE mode and the determination of the engine output $P_{ICE}$ in the ELECTRICITY GENERATING DRIVE mode may be effected using physical quantities other than the fuel consumption amount Mfc and the exhaust gas amount. The above changes or modifications are equally applicable to the second embodiment.

In the first embodiment, the fuel consumption amounts $M_{fcm}$, $M_{fce}$ are calculated in each cycle of execution of the routine of FIG. 3 depending upon the running condition of the vehicle such as the required drive power $P_L$. In this connection, it is noted that the maximum energy conversion efficiencies $\eta_{GEN}$ and $\eta_{MOT}$ ($\eta_{MOTmax}$ indicated in FIG. 6) of the motor 14 are about 92%, while the input and output efficiency $\eta_{BIN} \times \eta_{BOUT}$ of the electric energy storage device 22 is about 85%, whereby the overall energy conversion efficiency of the electric control, system is about $0.72=0.92 \times 0.85 \times 0.92$. In view of this fact, it is possible to select the ENGINE DRIVE mode if the fuel consumption efficiency $\eta_{ICE}$ for running the vehicle in the ENGINE DRIVE mode with the engine 12 selected as the drive power source is larger than a threshold $0.7\eta_{ICEmax}$ indicated in FIG. 5, which threshold is 70% of the maximum fuel consumption efficiency $\eta_{ICEmax}$, and select the MOTOR DRIVE mode if the fuel consumption efficiency $\eta_{ICE}$ is smaller than the threshold $0.7\eta_{ICEmax}$. This modified arrangement, which also meets the principle of the present invention, facilitates the selection of the ENGINE. DRIVE mode and the MOTOR DRIVE mode, by simply obtaining the fuel consumption efficiency $\eta_{ICEmax}$ in the ENGINE DRIVE mode. The threshold is not limited to 70% of the maximum fuel consumption efficiency $\eta_{ICEmax}$, but may be suitably determined depending upon the energy conversion efficiencies of the motor 14 and the electric energy storage device 22. The concept of this modification of the first embodiment is embodied as the data map shown in FIG. 11 used in the second embodiment. Where the overall energy conversion efficiency of the electric control system varies to a comparatively large extent, it is desirable to select the ENGINE DRIVE mode if the fuel consumption efficiency $\eta_{ICE}$ in the ENGINE DRIVE mode is larger than the threshold, and select the ENGINE DRIVE mode or the MOTOR DRIVE mode by implementing steps S3–S6 of FIG. 3 if the fuel consumption efficiency $\eta_{ICE}$ is smaller than the threshold. Similar modification is possible where the exhaust gas amount is reduced by replacing the fuel consumption efficiency $\eta_{ICE}$ by the exhaust gas emission efficiency.

In step R1 of the ELECTRICITY GENERATING DRIVE mode sub-routine of FIG. 4, the engine output $P_{ICE}$ is initially set to be equal to the required drive power $P_L$, and is incremented by the predetermined amount $\Delta P_{ICE}$ each time the sub-routine is executed, so that the engine output $P_{ICE}$ whose overall fuel consumption efficiency $\eta_T$ is the highest is selected in step R5. However, the manner of determining the engine output $P_{ICE}$ so as to maximize the overall fuel consumption efficiency $\eta_T$ may be modified as needed. For example, the engine output $P_{ICE}$ may be selected within a predetermined range along a line L representative of the minimum fuel consumption rate as indicated by one-dot chain line in the graph of FIG. 5. This predetermined range has a predetermined width in the direction of the engine torque $T_E$ on the upper and lower sides of the line L.

Although the first embodiment is adapted to select one of the ENGINE DRIVE, MOTOR DRIVE and ELECTRICITY GENERATING DRIVE modes, the modes available in the first embodiment may be suitably changed. For instance, the first embodiment may be modified to have the ENGINE-MOTOR DRIVE mode in which the vehicle is driven by simultaneous operation of the engine 12 and the motor 14 and which is selected when the vehicle load is comparatively high.

While the electric motor 14, 114 functions also as the electric generator or dynamo in the illustrated embodiments, a separate electric generator may be provided in addition to the electric motor which is operated for the sole purpose of driving the vehicle.

In the second embodiment, the selection of the ENGINE DRIVE, MOTOR DRIVE and ENGINE-MOTOR DRIVE modes is effected according to the boundary lines B and C as represented by the stored data map. However, the selection may be effected using equations similar to the equations (1) and (2) used in the first embodiment.

Although the second embodiment uses the clutch 130 between the internal combustion engine 112 and the transmission 116, another clutch may be disposed between the transmission 116 and the electric motor 114, for example. It is also noted that the principle of the present invention is equally applicable to a vehicle drive control apparatus wherein the outputs of the engine 112 and 114 are combined by a suitable device such as a planetary gear device, to provide a single input to the transmission 116.

It is to be understood that the present invention may be embodied with various other changes, modifications and improvements, which may occur to those skilled in the art, in the light of the foregoing teachings.

What is claimed is:

1. A drive control apparatus for an automotive vehicle having an electric generator for generating an electric energy, an electric energy storage device for storing the electric energy generated by said electric generator, an electric motor operated as a first drive power source by said electric energy, and an engine operated as a second drive power source by combustion of a fuel, said apparatus having an engine drive mode in which the vehicle is driven by said engine, a motor drive mode in which the vehicle is driven by said electric motor, and an electricity generating mode in which said electric generator is operated by said engine to charge said electric energy storage device, said apparatus including drive source selecting means for selecting one of said engine drive mode, said motor drive mode and said electricity generating mode, depending upon a running condition of the vehicle, wherein said drive source selecting means selects one of said engine drive mode and said motor drive mode, on the basis of a first value in said engine drive mode of a physical quantity relating to a condition of said engine and a second value of said physical quantity reflecting energy conversion efficiencies of said electric generator, said electric motor and said electric energy storage device in said electricity generating mode, and according to a predetermined rule associated with said first and second values.

2. A drive control apparatus according to claim 1, wherein said drive source selecting means comprises:

first calculating means for obtaining said first value of said physical quantity in said engine drive mode;

second calculating means for obtaining said second value of said physical quantity which second value reflects the energy conversion efficiencies in said electricity generating mode in which said electric generator is operated by said engine to generate said electric energy to be stored in said electric energy storage device and used by said electric motor in said motor drive mode; and comparing means for comparing said first and second values of said physical quantity obtained by said first and second calculating means, and selecting one of said engine drive mode and said motor drive mode depending upon whether one of said first and second values is smaller than the other.

3. A drive control apparatus according to claim 1, wherein said physical quantity consists of an amount of consumption of said fuel by said engine.

4. A drive control apparatus according to 2, wherein said physical quantity consists of an amount of consumption of said fuel by said engine, and wherein said first and second calculating means obtain a first value and a second value of said amount of consumption of said fuel in said engine drive mode and said electricity generating mode, respectively, said comparing means selecting said engine drive mode if said first value obtained by said first calculating means is smaller than said second value obtained by said second calculating means, and selecting said motor drive mode if said first value is not smaller than said second value.

5. A drive control apparatus according to claim 4, wherein said first calculating means calculates said first value of said amount of consumption of said fuel in said engine drive mode, by using a speed and a torque of said engine, and said second calculating means calculates said second value of said amount of consumption of said fuel by said engine in said electricity generating mode, by using a speed and a torque of said electric motor.

6. A drive control apparatus according to claim 1, wherein said energy conversion efficiencies comprise at least one of: efficiency of conversion of a kinetic energy into said electric energy by said electric generator in said electricity generating mode; efficiency of charging of said electric energy storage device with said electric energy generated by said electric generator in said electricity generating mode; efficiency of discharging of said electric energy storage device in said motor drive mode; and efficiency of conversion of said electric energy stored in said electric energy storage device into a kinetic energy by said electric motor in said motor drive mode.

7. A drive control apparatus according to claim 1, wherein said electric motor (14) also functions as said electric generator.

8. A drive control apparatus according to claim 1, further comprising engine output determining means for determining a desired output of said engine in said electricity generating mode, on the basis of an overall efficiency of a system assigned to charge said electric energy storage device in said electricity generating mode, said overall efficiency being associated with a physical quantity relating to a condition of said engine, and said overall efficiency reflecting energy conversion efficiencies of said electric energy storage device and said electric generator in said electricity generating mode.

9. A drive control apparatus according to claim 1, wherein the drive control apparatus further includes a transmission to which power from the first drive power source and second drive power source is simultaneously or selectively transferred.

10. A drive control apparatus for an automotive vehicle having an electric generator for generating an electric energy, an electric energy storage device for storing the electric energy generated by said electric generator, an electric motor operated as a first drive power source by said electric energy, and an engine operated as a second drive power source by combustion of a fuel, said apparatus having an engine drive mode in which the vehicle is driven by said engine, a motor drive mode in which the vehicle is driven by said electric motor, and an electricity generating mode in which said electric generator is operated by said engine to charge said electric energy storage device, the drive control apparatus comprising:

engine output determining means for determining a desired output of said engine in said electricity generating mode on the basis of an overall efficiency of a system assigned to charge said electric energy storage device in said electricity generating mode, said overall efficiency being associated with a physical quantity relating to a condition of said engine, and said overall efficiency reflecting energy conversion efficiencies of said electric energy storage device and said electric generator in said electricity generating mode; wherein said desired output is larger than a value of drive power required for said engine to drive the vehicle in said engine drive mode by a predetermined amount which provides surplus power by which said electric generator is operated to charge said electric energy storage device; and wherein said energy output determining means comprises:

calculating means for calculating values of said overall efficiency which correspond to different candidate values of said desired output of the engine, respectively said values of said overall efficiency reflecting the energy conversion efficiencies of said electric energy storage device in said electric generator during operation of said electric generator by said surplus power in said electricity generating mode; and selecting means for selecting one of said different candidate values of said desired output of said engine which corresponds to one of said values of said overall efficiency which satisfies a predetermined condition, and determining the selected candidate value as said desired output of the engine.

11. A drive control apparatus according to claim 10, wherein the drive control apparatus further includes a transmission to which power from the first drive power source and second drive power source is simultaneously or selectively transferred.

12. A drive control apparatus according to claim 10, wherein said selecting means selects, as said desired output of the engine, one of said candidate values which corresponds to a highest one of said values of said overall efficiency.

13. A drive control device for an automotive vehicle having an electric generator for generating an electric energy, an electric energy storage device for storing the electric energy generated by said electric generator, an electric motor operated as a first drive power source by said electric energy, and an engine operated as a second drive power source by combustion of a fuel, said apparatus comprising:

engine driving means for running the vehicle by operation of the engine in an engine drive mode while a running condition of the vehicle is held within an engine driving range;

motor driving means for running the vehicle by operation of the electric motor in a motor drive mode while said running condition is held within a motor driving range;

regenerative driving means for running the vehicle in a regenerative drive mode in which said electric generator is driven by a kinetic energy of the running vehicle so as to store an electric energy in said electric energy storage device as well as to apply a brake to the vehicle, said regenerative drive mode is selected when said running condition of the vehicle satisfies a predetermined requirement; and enlarging means for enlarging said motor driving range when an amount of the electric energy stored in said electric energy storage device by operation of said electric generator in said regenerative drive mode is larger than a predetermined threshold.

14. A drive control apparatus according to claim 13, wherein said engine driving range and said motor driving range are determined on the basis of a physical quantity relating to a condition of said engine in said engine drive mode and in an electricity generating mode in which said electric generator is driven by said engine to generate the electric energy which is stored in said electric energy storage device and which is used by said electric motor in said motor drive mode, and wherein said enlarging means enlarges said motor driving range such that a portion of said engine driving range in which the operation of said engine is less desirable in terms of said physical quantity than in the other portion of said engine driving range is replaced by a portion of the enlarged motor driving range.

15. A drive control apparatus according to claim 14, wherein said engine driving range and said motor driving range are determined on the basis of a first value of said physical quantity in said engine drive mode and a second value of said physical quantity which reflects energy conversion efficiencies of said electric generator, said electric motor and said electric energy storage device in said electricity generating mode.

16. A drive control apparatus according to claim 13, further comprising memory means for storing a data map representative of boundary lines which define said engine driving range and motor driving range in relation to said running condition of the vehicle, and wherein said enlarging means comprises shifting means for shifting one of said boundary lines to enlarge said motor driving range.

17. A drive control apparatus according to claim 13, wherein said enlarging means enlarges said motor driving range such that an amount of enlargement of the motor driving range is held constant irrespective of the amount of the electric energy stored in said electric energy storage device.

18. A drive control apparatus according to claim 13, wherein said enlarging means comprises:

detecting means for detecting the amount of the electric energy stored in said electric energy storage device in said regenerative drive mode;

determining means for determining whether the amount of the electric energy detected by said detecting means is larger than said predetermined threshold; and means for enlarging said motor driving range if said determining means determines that the amount of the electric energy detected by said detecting means is larger than said predetermined threshold.

19. A drive control device according to claim 13, wherein the drive control device further includes a transmission to which power from the first drive power source and second drive power source is simultaneously or selectively transferred.

* * * * *